US012414501B2

(12) United States Patent
Chen et al.

(10) Patent No.: US 12,414,501 B2
(45) Date of Patent: Sep. 16, 2025

(54) SELF-MOVING LAWN MOWER AND SUPPLEMENTARY OPERATION METHOD FOR AN UNMOWED REGION THEREOF

(71) Applicant: Nanjing Chervon Industry Co., Ltd., Nanjing (CN)

(72) Inventors: Weipeng Chen, Nanjing (CN); Dezhong Yang, Nanjing (CN); QingXiao Mei, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 886 days.

(21) Appl. No.: 17/665,951

(22) Filed: Feb. 7, 2022

(65) Prior Publication Data

US 2022/0151147 A1 May 19, 2022

Related U.S. Application Data

(63) Continuation of application No. PCT/CN2020/111632, filed on Aug. 27, 2020.

(30) Foreign Application Priority Data

Aug. 27, 2019 (CN) .......................... 201910793036.2
Sep. 12, 2019 (CN) .......................... 201910865102.2
Dec. 31, 2019 (CN) .......................... 201911411522.X

(51) Int. Cl.
*A01D 34/00* (2006.01)
*A01D 34/78* (2006.01)
(Continued)

(52) U.S. Cl.
CPC .......... *A01D 34/008* (2013.01); *A01D 34/78* (2013.01); *A01D 69/02* (2013.01); *G01S 19/47* (2013.01);
(Continued)

(58) Field of Classification Search
CPC ...... A01D 34/008; A01D 34/78; A01D 69/02; G01S 19/47; G05D 1/0219; G05D 1/0221; G05D 1/0274
See application file for complete search history.

(56) References Cited

U.S. PATENT DOCUMENTS 12,038,752 B1 * 7/2024 Blanton ............... G05D 1/0088
2018/0004217 A1 1/2018 Biber et al.
(Continued)

FOREIGN PATENT DOCUMENTS

| CN | 103839069 A | 6/2014 |
| CN | 103891463 A | 7/2014 |

(Continued)

OTHER PUBLICATIONS

ISA/CN, International Search Report issued on PCT application No. PCT/CN2020/111632, dated Dec. 1, 2020, 5 pages.
(Continued)

*Primary Examiner* — Joseph M Rocca
*Assistant Examiner* — Robert E Pezzuto
(74) *Attorney, Agent, or Firm* — Greenberg Traurig, LLP

(57) ABSTRACT

A self-moving mowing system includes a self-moving lawn mower and a control unit. The control unit includes a boundary acquisition module, an unmowed region determination module, a filling planning module, and a control module. The boundary acquisition module is configured to acquire information about an operation boundary so as to control the self-moving lawn mower to operate within the operation boundary. The unmowed region determination module is configured to identify information about unmowed regions within the operation boundary. The filling planning module is configured to generate an operation route along which mowing is sequentially performed in at least one unmowed region among all the unmowed regions. The
(Continued)

control module is configured to control the self-moving lawn mower to mow in the at least one unmowed region among all the unmowed regions according to the operation route.

15 Claims, 28 Drawing Sheets

(51) Int. Cl.
*A01D 69/02* (2006.01)
*G01D 1/00* (2006.01)
*G01D 1/02* (2006.01)
*G01S 19/47* (2010.01)
*G05D 1/00* (2006.01)
*A01D 101/00* (2006.01)

(52) U.S. Cl.
CPC ....... *G05D 1/0219* (2013.01); *A01D 2101/00* (2013.01)

(56) References Cited

U.S. PATENT DOCUMENTS

| | | | | |
|---|---|---|---|---|
| 2020/0050208 | A1* | 2/2020 | Frick | G05D 1/246 |
| 2021/0096574 | A1* | 4/2021 | Lee | G05D 1/0225 |

FOREIGN PATENT DOCUMENTS

| | | | |
|---|---|---|---|
| CN | 105988471 A | 10/2016 | |
| CN | 106155053 A | 11/2016 | |
| CN | 107390698 A | 11/2017 | |
| CN | 107637255 A | 1/2018 | |
| CN | 107831773 A | 3/2018 | |
| CN | 107966725 A | 4/2018 | |
| CN | 108490932 A | 9/2018 | |
| CN | 108781704 A | 11/2018 | |
| CN | 109634287 A | 4/2019 | |
| CN | 110168465 A | 8/2019 | |
| GB | 2285905 A | 8/1995 | |
| IT | 201600116383 A | 5/2018 | |
| WO | 2014027945 A1 | 2/2014 | |
| WO | 2018/014838 A1 | 1/2018 | |
| WO | 2018001358 A1 | 1/2018 | |

OTHER PUBLICATIONS

ISA/CN, English translation of International Search Report issued on PCT application No. PCT/CN2020/111632, dated Dec. 1, 2020, 3 pages.
ISA/CN, Written Opinion issued on PCT application No. PCT/CN2020/111632, dated Dec. 1, 2020, 3 pages.
ISA/CN, English translation of Written Opinion issued on PCT application No. PCT/CN2020/111632, dated Dec. 1, 2020, 3 pages.
Liu, Rong et al., Path Planning for UAV Based on Improved Chaotic Ant Colony Algorithm (CACA), Command Information System and Technology), vol. 9, No. 6, Jan. 14, 2019 (Jan. 14, 2019), https://portal.issn.org/resource/ISSN/1674-909X, p. 43 right-hand column and p. 44 left-hand column.
EPO, extended European search report issued on European patent application No. 20856753.7, dated Feb. 10, 2023, 8 pages.

* cited by examiner

SELF-MOVING LAWN MOWER AND SUPPLEMENTARY OPERATION METHOD FOR AN UNMOWED REGION THEREOF

RELATED APPLICATION INFORMATION

This application is a continuation of International Application Number PCT/CN2020/111632, filed on Aug. 27, 2020, through which this application also claims the benefit under 35 U.S.C. § 119(a) of Chinese Patent Application No. 201910793036.2, filed on Aug. 27, 2019, Chinese Patent Application No. CN 201910865102.2, filed on Sep. 12, 2019, and Chinese Patent Application No. CN 201911411522.X, filed on Dec. 31, 2019, all of which are incorporated herein by reference in their entirety.

BACKGROUND

As an outdoor mowing tool, an intelligent self-moving lawn mower is favored by users due to no need for long-term operation of the users and its intelligence and convenience. At present, the route planning of the self-moving lawn mower is generally a random operation so that there will be unmowed regions. A relatively long time is needed for supplementary operation for all the unmowed regions through the random operation of the self-moving lawn mower. Therefore, the self-moving lawn mower has a relatively short service life and wastes energy, and the unmowed regions easily appear so that a lawn is not beautiful.

SUMMARY

In one example, a self-moving mowing system is provided. The self-moving mowing system includes a self-moving lawn mower. The self-moving lawn mower includes a main body, a mowing element, an output motor, moving wheels, and a drive motor. The main body includes a casing. The mowing element is connected to the main body and configured to cut vegetation. The output motor is configured to drive the mowing element. The moving wheels are connected to the main body. The drive motor is configured to drive the moving wheels to rotate. The self-moving mowing system further includes a control unit and a positioning assembly. The control unit is connected to and configured to control the output motor and the drive motor. The positioning assembly includes at least an image sensor configured to sense a region through which the self-moving lawn mower passes and form some pieces of positional image information to analyze a relative displacement of the self-moving lawn mower. The control unit includes a boundary acquisition module, an unmowed region determination module, a filling planning module, and a control module. The boundary acquisition module is configured to acquire information of an operation boundary to control the self-moving lawn mower to operate within the operation boundary. The unmowed region determination module is configured to identify an unmowed region within the operation boundary and position information of the unmowed region. The filling planning module is configured to generate an operation route for sequentially mowing in at least one unmowed region among all unmowed regions. The control module is configured to control the self-moving lawn mower to mow in the at least one unmowed region among all the unmowed regions according to the operation route.

In one example, the image sensor is configured to sense and form first positional image information and second positional image information in chronological order, where the first positional image information and the second positional image information have at least one common feature area; the control unit is configured to obtain, through an analysis, a relative displacement of the self-moving lawn mower according to at least a temporal moving trajectory of the at least one common feature area of the first positional image information and the second positional image information of the image sensor.

In one example, a self-moving mowing system is provided. The self-moving mowing system includes a self-moving lawn mower. The self-moving lawn mower includes a main body, a mowing element, an output motor, moving wheels, and a drive motor. The main body includes a casing. The mowing element is connected to the main body and configured to cut vegetation. The output motor is configured to drive the mowing element. The moving wheels are connected to the main body. The drive motor is configured to drive the moving wheels to rotate. The self-moving mowing system further includes a control unit. The control unit is connected to and configured to control the output motor and the drive motor. The control unit includes a boundary acquisition module, an unmowed region determination module, a filling planning module, and a control module. The boundary acquisition module is configured to acquire information of an operation boundary to control the self-moving lawn mower to operate within the operation boundary. The unmowed region determination module is configured to identify an unmowed region within the operation boundary and position information of the unmowed region. The filling planning module is configured to generate an operation route for sequentially mowing in at least one unmowed region among all unmowed regions. The control module is configured to control the self-moving lawn mower to mow in the at least one unmowed region among all the unmowed regions according to the operation route.

In one example, a shortest route for sequentially mowing in the at least one unmowed region among all the unmowed regions is defined as a shortest operation route, and a ratio of a length of the operation route to a length of the shortest operation route is greater than or equal to 1 and less than or equal to 1.2.

In one example, the ratio of the length of the operation route to the length of the shortest operation route is greater than or equal to 1 and less than or equal to 1.1.

In one example, the filling planning module is configured to calculate the shortest operation route for supplementary operation for all the unmowed regions of the self-moving lawn mower.

In one example, the control module is configured to control the self-moving lawn mower to perform the supplementary operation on the unmowed regions in a sequence in which the supplementary operation is performed on the unmowed regions along the shortest operation route.

In one example, after the self-moving lawn mower performs the supplementary operation on the unmowed region, a coverage rate of the self-moving lawn mower controlled to perform the supplementary operation on the unmowed region is greater than 80%.

In one example, the positioning assembly includes one of or a combination of a global positioning system (GPS) positioning unit, an inertial measurement unit (IMU), a displacement sensor, or an image sensor.

In one example, the positioning assembly is configured to acquire an operation trajectory of the self-moving lawn mower, and a non-operated region within the operation boundary of the self-moving lawn mower is determined according to the operation trajectory of the self-moving lawn mower and operation boundary information, where in the case where an area of the non-operated region is greater than a preset value, it is determined that the non-operated region is an unmowed region.

In one example, a detection module includes an image sensor, where the image sensor is configured to acquire a two-dimensional image or a three-dimensional image within the operation boundary to acquire information of the unmowed regions of the self-moving lawn mower.

In one example, a supplementary operation method for an unmowed region of a self-moving mowing system is provided. The method includes selecting an operation region of the self-moving mowing system; starting the self-moving mowing system and positioning a self-moving lawn mower of the self-moving mowing system to acquire an operation moving trajectory and determine that a region covered by moving operation of the self-moving lawn mower is an operated region; analyzing a non-operated region in the operation region according to the operation region and the operated region and determining that a non-operated region with an area greater than a preset value is an unmowed region; planning an operation route for supplementary operation for the unmowed region according to information of the unmowed region; and controlling the self-moving lawn mower to perform the supplementary operation on at least one of all unmowed regions according to the operation route, where a ratio of a length of an operation route of the self-moving lawn mower to a length of a corresponding shortest operation route for completion of the supplementary operation for the at least one unmowed region among all the unmowed regions is greater than or equal to 1 and less than or equal to 1.2.

In one example, the supplementary operation method for an unmowed region of a self-moving mowing system further includes generating m simulation actuators, where each of the m simulation actuators is configured to randomly select one of all the unmowed regions as a starting point; selecting, by each of the m simulation actuators, a next unmowed region with a transition probability P, recording a simulation route simulated by each of the m simulation actuators after all the unmowed regions are separately selected by the m simulation actuators, setting a mark factor for the simulation route according to an information concentration function τ, and recording the above as an iterative calculation; after a number of iterations is greater than a preset value, acquiring a simulation route simulated by the m simulation actuators with most simulation times, and determining the simulation route as a shortest simulation route; and controlling the self-moving lawn mower to perform the supplementary operation on the at least one unmowed region among all the unmowed regions according to the shortest simulation route.

DETAILED DESCRIPTION

Figure 1:
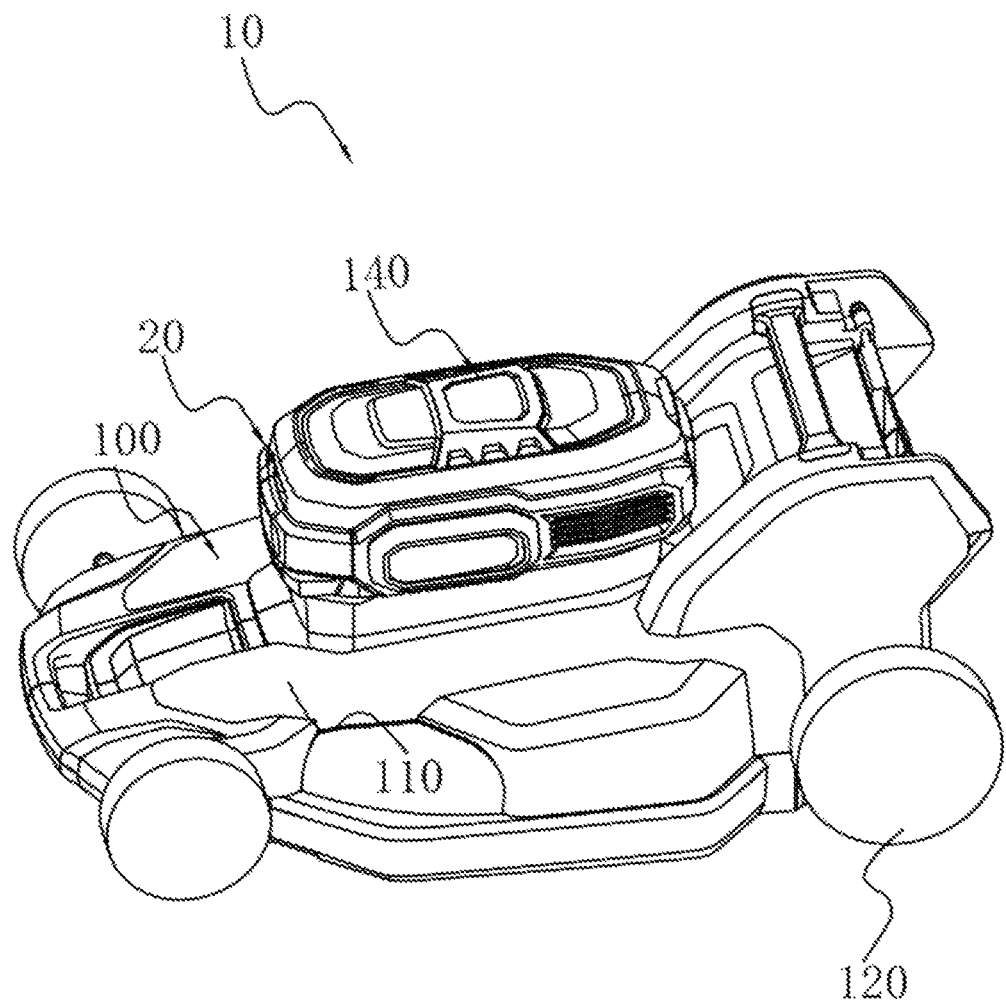
FIG. 1 is a plan view of a self-moving mowing system.

In an example of the present application, a self-moving mowing system is provided for intelligently mowing in a lawn and trimming the lawn. Referring to FIGS. 1 and 2, the self-moving mowing system includes at least a self-moving lawn mower 10. The self-moving lawn mower 10 includes a main body 100 and an execution assembly 101 connected to the main body 100. The execution assembly 101 includes moving wheels 120 and a mowing element 130. The mowing element 130 may be a blade for cutting vegetation. The main body 100 includes a casing 110, and the casing 110 is configured to package and support parts such as the moving wheels 120 and the mowing element 130. The moving wheels 120 are configured to drive the self-moving lawn mower 10 to move, and the mowing element 130 is configured to cut the vegetation. The self-moving lawn mower 10 further includes a control unit 200 configured to control an operation state of the self-moving lawn mower 10. The self-moving lawn mower 10 further includes an output motor 131 configured to drive the mowing element 130 and a drive motor 123 connected to the moving wheels 120, where the output motor 131 is configured to drive the mowing element 130 to rotate at a high speed to cut the vegetation, and the drive motor 123 is configured to drive the moving wheels 120 to rotate so as to drive the self-moving lawn mower 10 to move. The control unit 200 is configured to control the moving wheels 120 and the mowing element 130 to operate by controlling the output motor 131 and the drive motor 123. The self-moving lawn mower 10 further includes a power supply device 140. Optionally, the power supply device 140 is implemented as at least one battery pack and is connected to the self-moving lawn mower 10 through a battery pack interface on the self-moving lawn mower 10 so as to supply power to the output motor 131, the drive motor 123, and the control unit 200.

The self-moving lawn mower 10 includes an output controller configured to control the output motor 131 and a drive controller configured to control the drive motor 123. The output controller is connected to the control unit 200, and the control unit 200 is configured to transmit an instruction to control the output motor 131 to operate through the output controller so as to control a cutting state of the mowing element 130. The drive controller is connected to the drive motor 123 and configured to control the drive motor 123, and the drive controller is communicatively connected to the control unit 200 so that after receiving a start instruction from a user or determining that the self-moving lawn mower 10 is started, the control unit 200 analyzes a moving route of the self-moving lawn mower 10 and transmits a moving instruction to the drive controller so as to control the drive motor 123 to drive the moving wheels 120 to move.

Figure 2A:
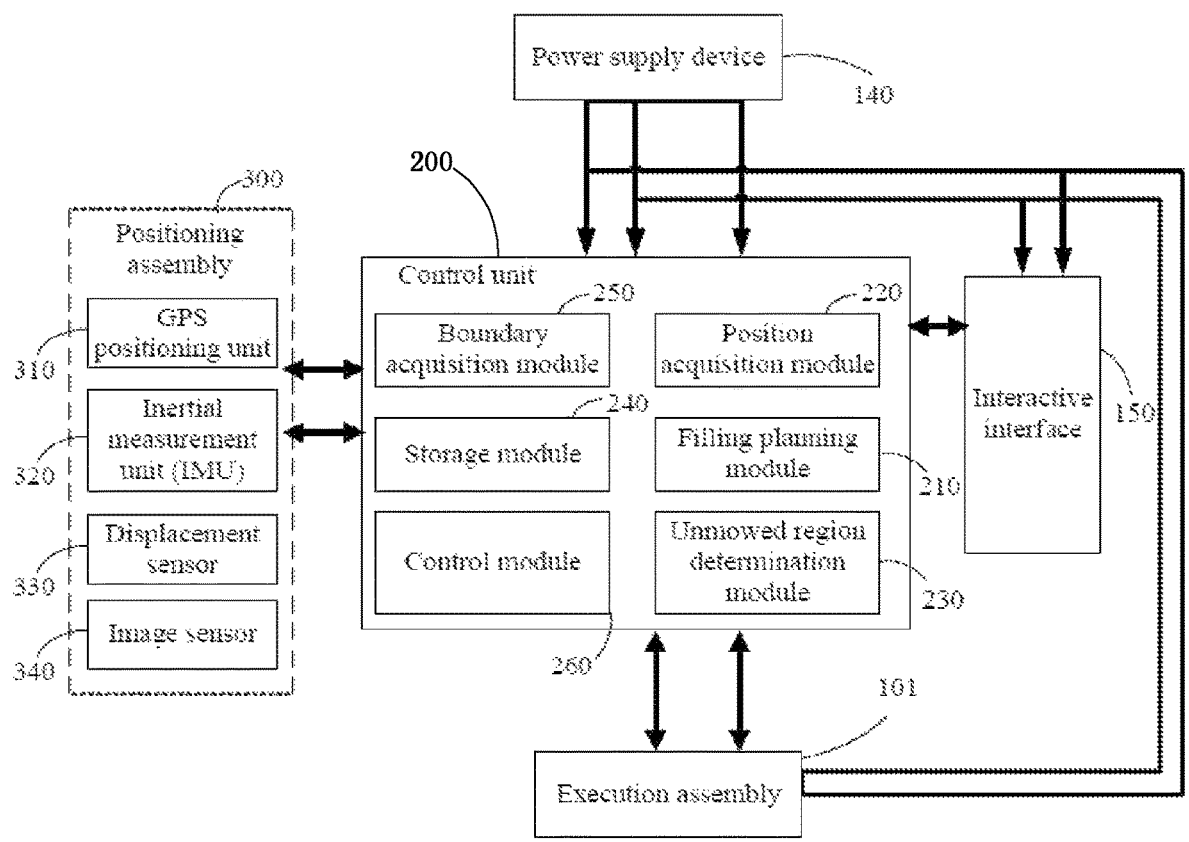
FIG. 2A is a schematic diagram of a structural framework of the self-moving mowing system in FIG. 1.
Figure 2B:
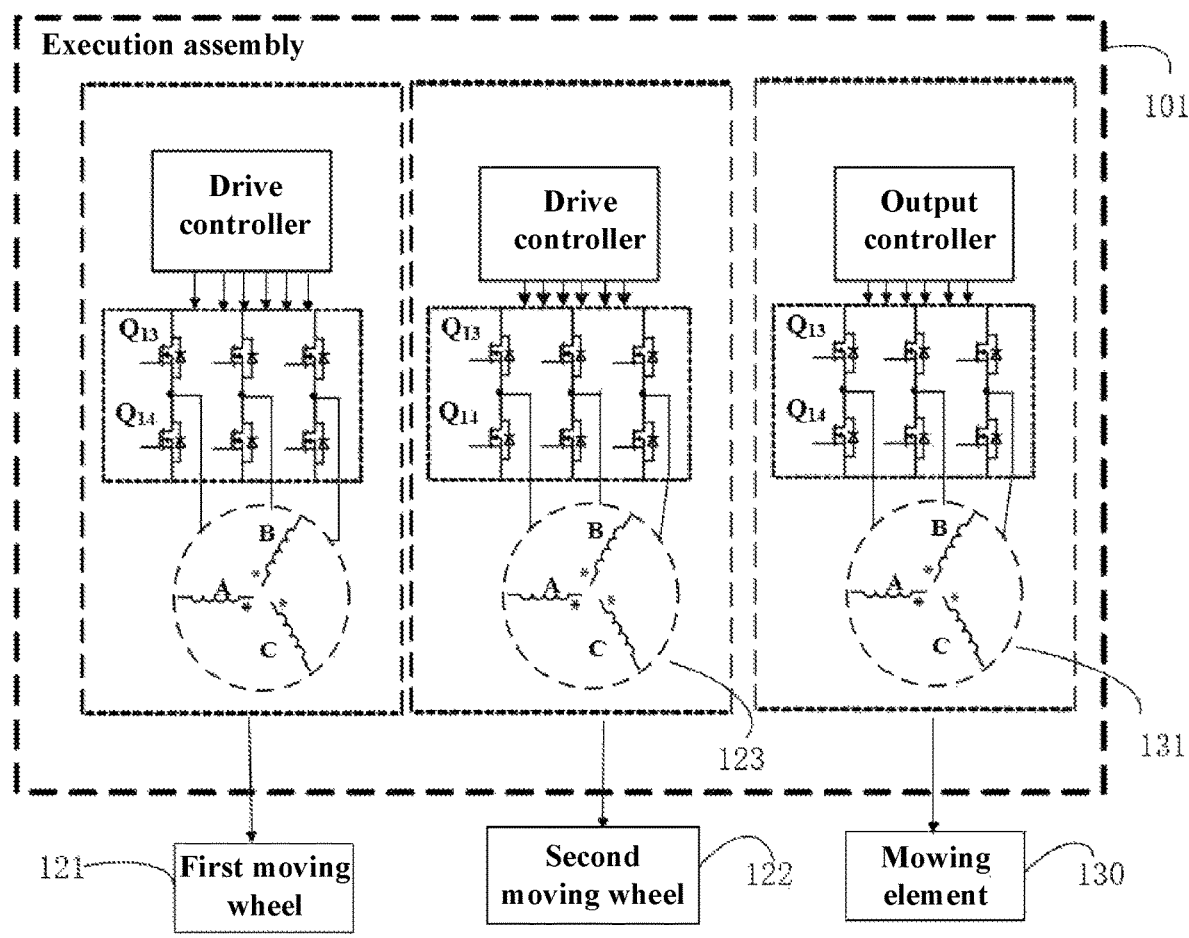
FIG. 2B is a schematic diagram of a framework of an execution assembly of the self-moving mowing system in FIG. 1.

Referring to FIGS. 2A and 2B, the control unit 200 is disposed in the self-moving mowing system, configured to be a circuit board, and connected to an interactive interface 150 for receiving user instructions. The interactive interface is provided with a button for the user to input information.

In an example, at least part of modules in the control unit 200 may also be installed in one or more mobile terminals; or the control unit 200 is communicatively connected to the mobile terminal, and the mobile terminal is used as an upper computer of the self-moving lawn mower 10. The mobile terminal may be implemented as a smart mobile device such as a computer and a smart phone, and the user may control the operation of the self-moving lawn mower 10 through the mobile terminal. In an example, the self-moving lawn mower 10 transmits signals with the mobile terminal through a communication device, and the control unit 200 is configured to operate in the mobile terminal. The control unit 200 calculates and analyzes position information of the self-moving lawn mower 10 and transmits signals to control the operation of the self-moving lawn mower 10.

Figure 3:
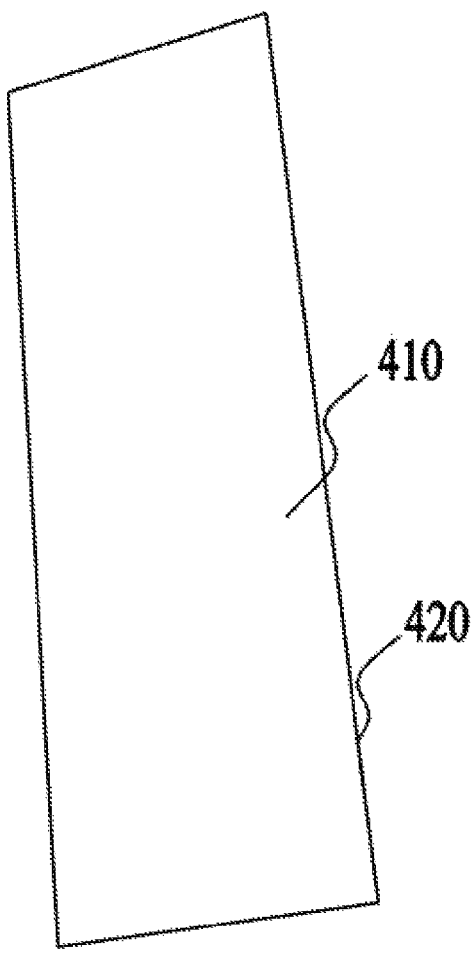
FIG. 3 is a schematic diagram of an operation region of the self-moving mowing system in FIG. 1.

The self-moving mowing system includes a detection module configured to detect the operation state of the self-moving lawn mower 10, and the detection module includes at least a positioning assembly 300 configured to acquire a position of the self-moving lawn mower 10. Real-time positioning data of the self-moving lawn mower 10 is analyzed so that the moving and mowing control of the self-moving lawn mower 10 is achieved. Referring to FIG. 3, the self-moving lawn mower 10 is restricted to operate in an operation region 410, the operation region 410 has an operation boundary 420, and the self-moving lawn mower 10 moves within the operation boundary 420 and mows when the self-moving lawn mower 10 is controlled to be turned on. The operation boundary 420 may be set through line embedding, which is a common method in the art and will not be described in detail here. In another manner of limiting the operation boundary 420, position coordinates of a target operation boundary 420 are selected so that the operation boundary 420 is selected, real-time position information of the self-moving lawn mower 10 is acquired, and the self-moving lawn mower 10 is adjusted and controlled so that the self-moving lawn mower 10 is restricted to operate within the operation boundary 420.

Figure 4:
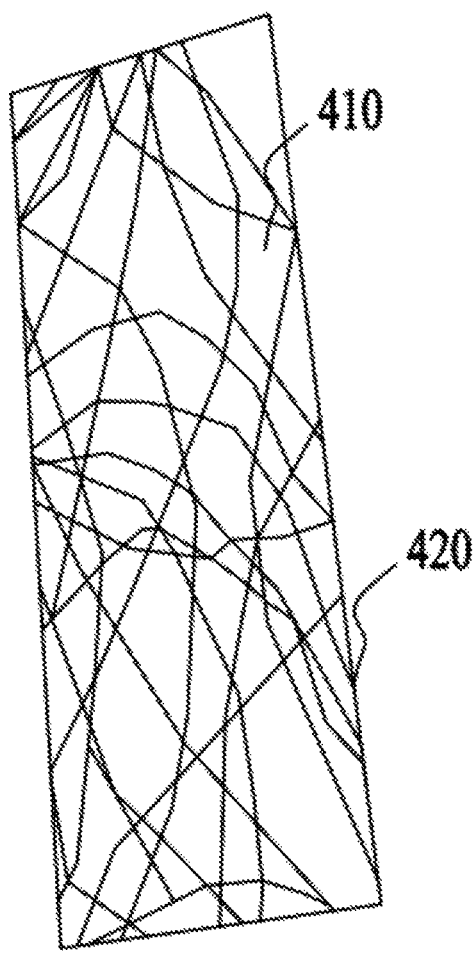
FIG. 4 is a schematic diagram of a record of an operation trajectory of a self-moving lawn mower in the operation region in FIG. 3 at a first operation stage.

Referring to FIGS. 2 and 4, the positioning assembly 300 includes one of or a combination of a GPS positioning unit 310, an IMU 320, a displacement sensor 330, and an image sensor 340 and is configured to acquire the position of the self-moving lawn mower 10. In an example of the positioning assembly 300, the positioning assembly 300 includes at least the GPS positioning unit 310 configured to acquire the position of the self-moving lawn mower 10. The positioning assembly 300 further includes the image sensor 340 and/or the displacement sensor 330. The image sensor 340 is disposed on the casing 110 or the main body 100 of the self-moving lawn mower 10 and configured to analyze displacement data of the self-moving lawn mower 10 by acquiring image information of a scene around the self-moving lawn mower 10. The displacement sensor 330 may be disposed on the drive motor 123 or the moving wheel 120 and configured to acquire the displacement data of the self-moving lawn mower 10. The position information is directly acquired through one of the GPS positioning unit 310, the IMU 320, the displacement sensor 330, and the image sensor 340, or relatively accurate position information is acquired through information obtained by multiple devices of the preceding devices in conjunction with correction. The self-moving mowing system includes a boundary acquisition module 250 configured to acquire information about the operation boundary so that the self-moving lawn mower 10 is controlled to operate within the operation boundary. The user sets the operation boundary 420 through the self-moving lawn mower or the mobile terminal so that the boundary acquisition module 250 acquires position information and distribution information of the operation boundary 420, where the position information of the operation boundary 420 may be information about a distance of the operation boundary 420 from a current position of the self-moving mowing system or may be longitude and latitude positioning data of the operation boundary 420. After the self-moving mowing system acquires an operation start instruction, the self-moving mowing system executes a first operation stage. At the first operation stage, the self-moving lawn mower 10 is controlled by the control unit 200 to move and mow in the operation region 410 within the operation boundary 420. A moving trajectory of the self-moving lawn mower 10 may be disordered or the self-moving lawn mower 10 is controlled to operate according to a preset route.

Figure 5:
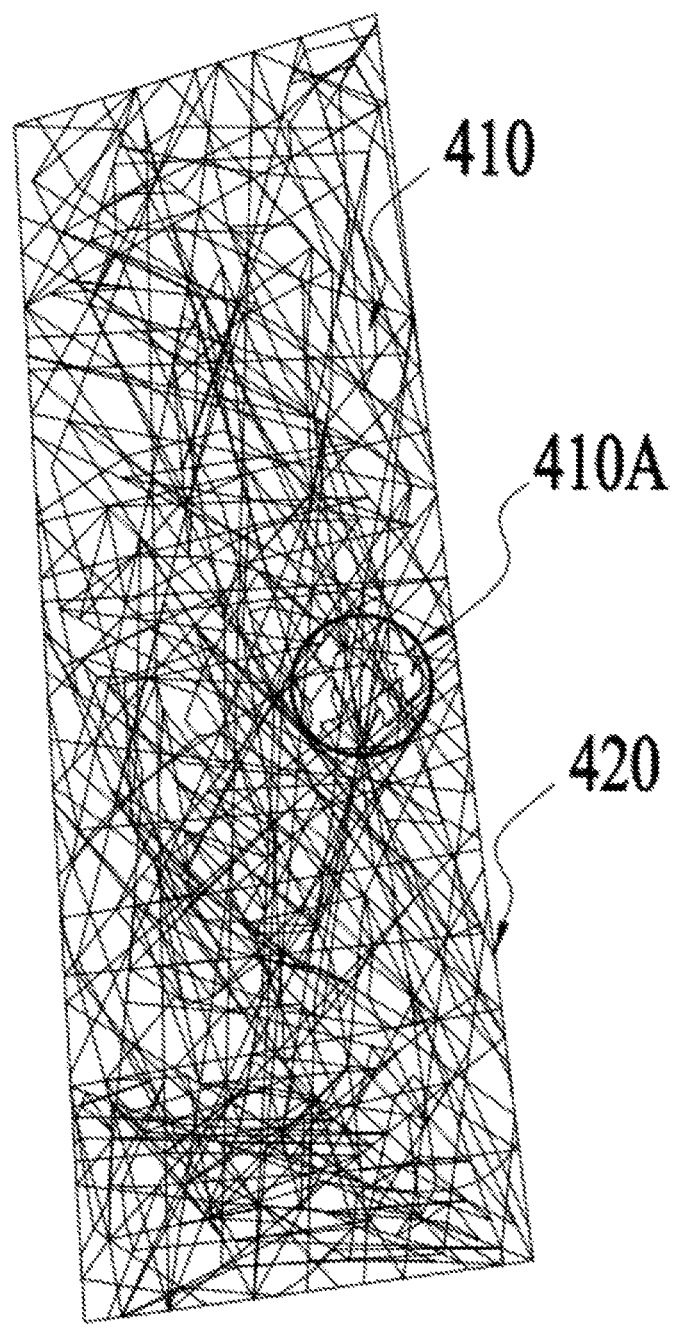
FIG. 5 is a schematic diagram of a record of an operation trajectory of a self-moving lawn mower in the operation region in FIG. 3 at a second operation stage.

Referring to FIG. 5, the control unit 200 acquires a real-time position of the self-moving lawn mower 10 during operation. The control unit 200 includes a position acquisition module 220 and a storage module 240. The position acquisition module 220 is communicatively connected to the positioning assembly 300 and configured to acquire a real-time displacement trajectory of the self-moving lawn mower 10, and the storage module 240 is configured to store and mark mowed regions of the self-moving lawn mower 10 so that the real-time distribution of the mowed regions and unmowed regions can be analyzed. In the case where it is calculated that a ratio of an area of an operated region to an area of the operation region 410 is greater than a preset ratio, for example, 60%, it is determined that the first operation stage is completed, and the self-moving lawn mower 10 is controlled to end the first operation stage and enter a second operation stage. In another example, in the case where it is calculated that the ratio of the area of the operated region to the area of the operation region 410 is greater than 90%, the self-moving lawn mower 10 is controlled to enter the second operation stage. In another manner, in the case where it is calculated that the ratio of the area of the operated region to the area of the operation region 410 is greater than a preset value, the self-moving lawn mower 10 is controlled to enter the second operation stage, where the preset value may be greater than or equal to 60% and less than or equal to 90%.

Figure 6:
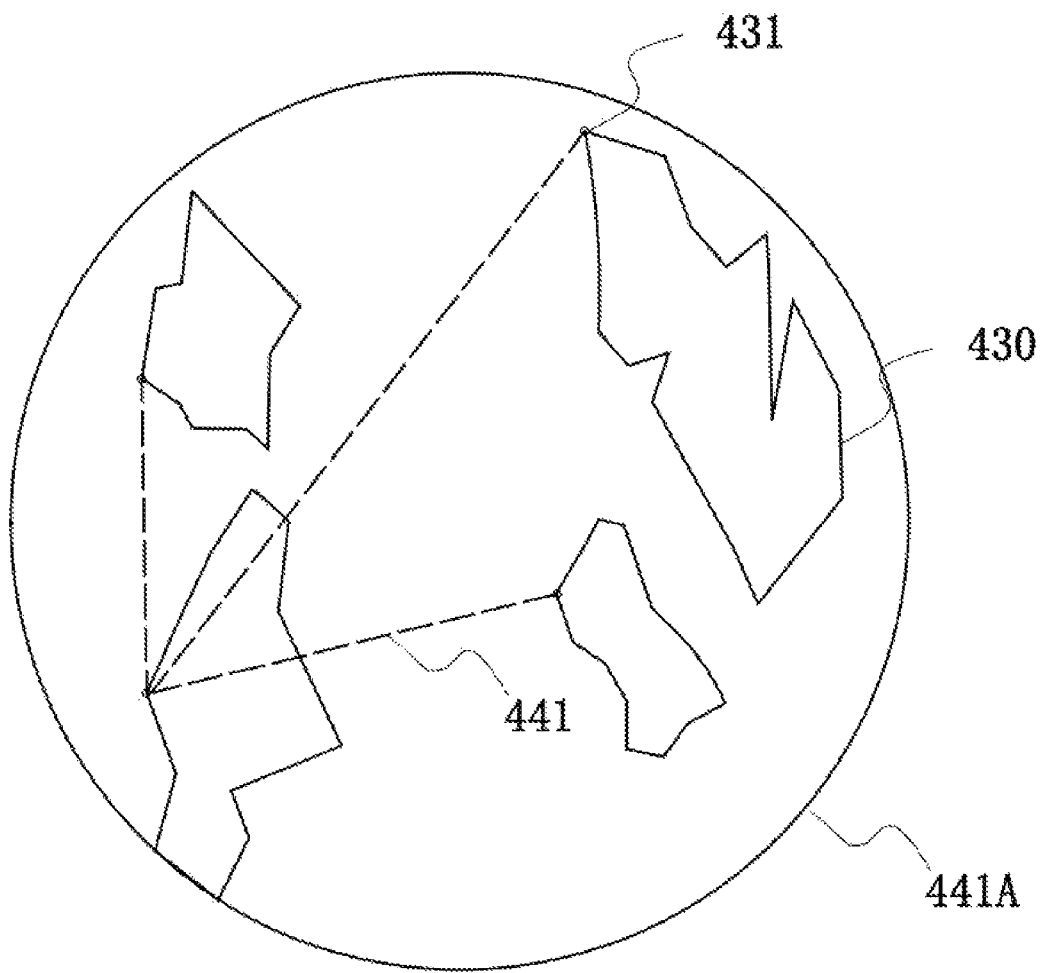
FIG. 6 is an enlarged diagram of unmowed regions in a partial operation region in FIG. 5.

FIG. 6 is an enlarged diagram of unmowed regions in a partial operation region 410A in FIG. 5. The control unit 200 further includes an unmowed region determination module 230 configured to acquire information about unmowed regions 430 of the self-moving lawn mower 10 during operation. The unmowed region determination module 230 acquires the operation boundary 420 and position information of the mowed regions stored in the storage module 240 and analyzes position information of regions other than the marked mowed regions in the operation region 410 within the operation boundary 420, so as to acquire position information of missed regions when the self-moving lawn mower 10 operates at the first operation stage and store the position information of the unmowed region 430 in the storage module 240, such as an area and coordinates of a non-operated region and distances between non-operated regions. Since a boundary of the non-operated region is acquired by tracking the displacement of the self-moving lawn mower 10, the preceding parameter information of the non-operated region may be acquired.

In another manner of determining the unmowed region, the detection module includes the image sensor 340 configured to detect the information about the unmowed regions. The determination of the unmowed region 430 of the self-moving lawn mower 10 is acquired by the image sensor 340. The image sensor 340 is disposed on the casing 110 or the main body 100. When the self-moving lawn mower 10 is at the first operation stage, the image sensor 340 directly captures an image of the lawn, acquires a two-dimensional image or a three-dimensional image within the operation boundary so as to acquire areas and position information of the unmowed regions and the information about the unmowed regions of the self-moving lawn mower. The control unit stores the areas and position information of the unmowed regions in the storage module 240, and refreshes information about the non-operated regions and stores the information about the non-operated regions in the self-moving lawn mower 10 as the self-moving lawn mower 10 moves and operates. After a ratio of a total area of the non-operated regions to the area of the operation region 410 is less than a preset value, for example, 10%, it is determined that the first operation stage is completed and controlled to end. At this time, the unmowed region determination module 230 acquires the information about the unmowed regions, that is, the position information and areas of the unmowed regions 430 and distances between unmowed regions 430.

The control unit 200 further includes a filling planning module 210 configured to plan supplementary operation for the unmowed region 430. The filling planning module 210 generates an operation route along which mowing is sequentially performed in at least one unmowed region among all the unmowed regions, analyzes the information about the unmowed regions 430 at the first operation stage, divides the unmowed regions 430 on which the supplementary operation needs to be performed into a first unmowed region, a second unmowed region, an N-th unmowed region, and so on, and orderly labels or sorts the first unmowed region, the second unmowed region, the N-th unmowed region, and so on, so as to generate a supplementary operation route for supplementary mowing at the second operation stage and control the self-moving lawn mower 10 to move and mow according to the generated supplementary operation route.

Referring to FIGS. 2A and 2B, the control unit 200 includes a control module 260, the control module 260 is connected to the drive motor and the output motor and configured to control the drive motor and the output motor, and the control module 260 is configured to drive the self-moving lawn mower 10 to move and mow according to the supplementary operation route. Two moving wheels 120 are provided, which are a first moving wheel 121 and a second moving wheel 122. The drive motor 123 includes a first drive motor and a second drive motor. The drive controller is connected to the first drive motor and the second drive motor. The control unit 200 controls a rotational speed of the first drive motor and a rotational speed of the second drive motor through the drive controller so as to control a moving state of the self-moving lawn mower 10. At the second operation stage, that is, when the supplementary operation is performed on the unmowed regions of the self-moving lawn mower, the control unit 200 controls, according to the supplementary operation route, the self-moving lawn mower 10 to move and operate according to a trajectory of the supplementary operation route so that the self-moving lawn mower 10 sequentially moves and operates according to a sequence of the unmowed regions and thus the self-moving lawn mower 10 completes the supplementary mowing with high efficiency.

At the second operation stage, the positioning assembly 300 of the self-moving mowing system acquires real-time positioning of the self-moving lawn mower 10. A moving speed and steering of the self-moving lawn mower 10 are controlled sequentially according to the position information of the unmowed regions 430 stored in the storage module 240, and the self-moving lawn mower 10 is controlled to operate in the corresponding unmowed regions 430. For example, at the second operation stage, the control unit 200 drives the self-moving lawn mower 10 to move toward the first unmowed region. By analyzing a distance between the current position of the self-moving lawn mower 10 and the first unmowed region, the control unit 200 causes the first moving wheel 121 and the second moving wheel 122 to rotate at different speeds through the drive controller and causes the self-moving lawn mower to steer and move toward the first unmowed region through the differential rotation of the first moving wheel 121 and the second moving wheel 122. In another example, the self-moving lawn mower 10 includes the first moving wheel 121, the second moving wheel 122, and a differential mechanism between the first moving wheel 121 and the second moving wheel 122, where the differential mechanism is used for the differential control of the first moving wheel 121 and the second moving wheel 122, and the differential mechanism is controlled through the drive controller so that the first moving wheel 121 and the second moving wheel 122 move at different speeds, and thus the self-moving lawn mower 10 steers.

When the positioning assembly 300 detects that the position of the self-moving lawn mower 10 overlaps with the first unmowed region, it is determined that the self-moving lawn mower 10 moves to the first unmowed region and an instruction is transmitted to the output controller so that the output motor 131 drives the mowing element 130 to rotate so as to mow in the first unmowed region. The unmowed region determination module 230 acquires whether the first unmowed region is completed, and when the operation of the self-moving lawn mower 10 on the first unmowed region is completed, it is determined that the supplementary operation for the first unmowed region is completed, the control unit 200 controls the self-moving lawn mower 10 to face the second unmowed region, and the preceding steps are repeated until the operation on all the unmowed regions 430 or unmowed regions on which the supplementary operation needs to be performed among all the unmowed regions is completed. In this manner, the operation efficiency of the self-moving lawn mower 10 is improved, and the supplementary mowing is effectively performed on unmowed regions of the self-moving lawn mower 10 at an early stage so that the lawn mowed by the self-moving mowing system is more beautiful and energy is saved.

The unmowed region determination module 230 analyzes the non-operated region and analyzes the boundary of the non-operated region according to the operation trajectory of the self-moving lawn mower 10. In the case where the area of the non-operated region is greater than a preset value, it is determined that the non-operated region is the unmowed region 430, the unmowed regions on which the supplementary operation needs to be performed among all the unmowed regions are determined in conjunction with an operation of the user, and the self-moving lawn mower 10 is controlled to sequentially perform the supplementary operation on the unmowed regions 430. In the case where the area of the non-operated region is less than the preset value, it is determined that the supplementary operation does not need to be performed on the non-operated region and the self-moving lawn mower 10 is controlled not to operate in the non-operated region.

Figure 7:
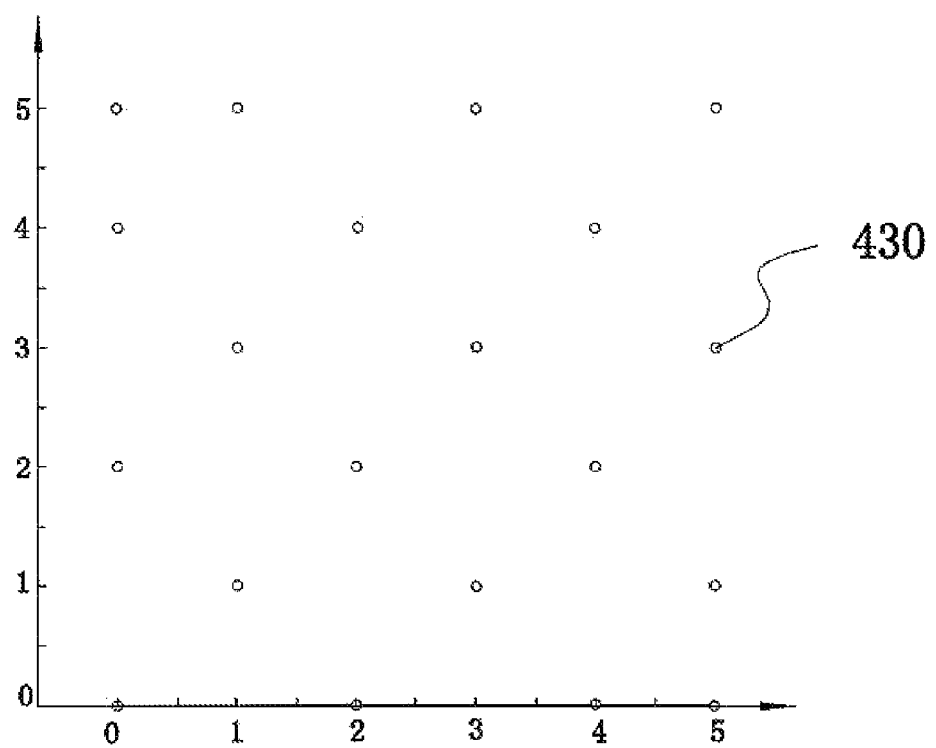
FIG. 7 is a schematic diagram of unmowed regions in an operation region of a self-moving mowing system.
Figure 8:
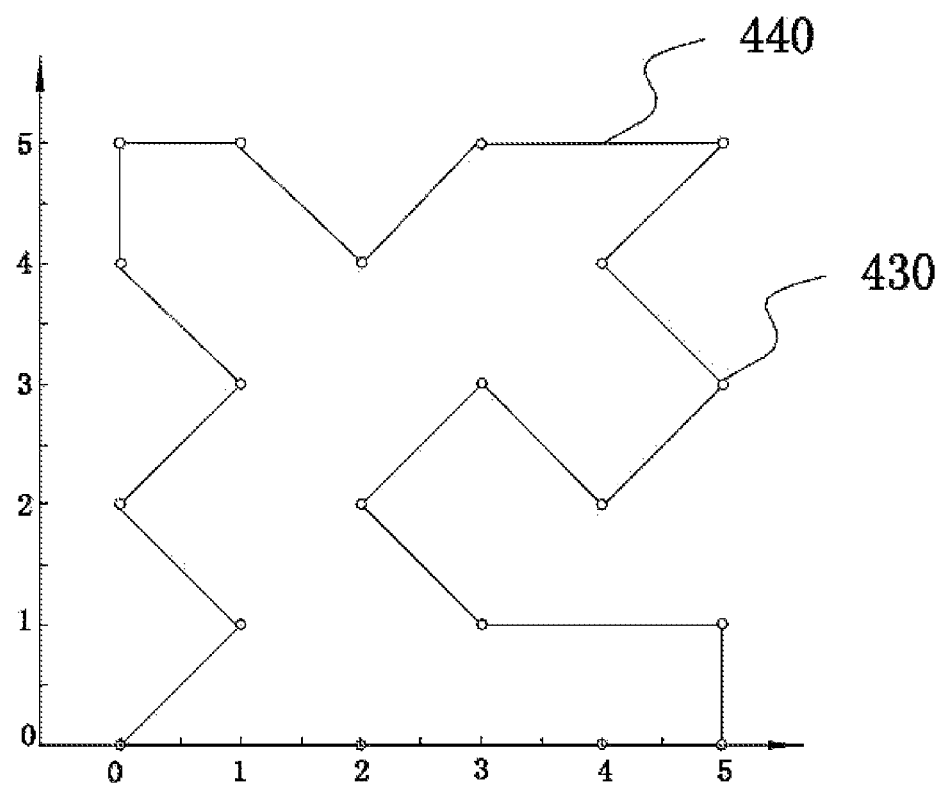
FIG. 8 is a schematic diagram of a shortest operation route along which a self-moving mowing system performs supplementary operation on the unmowed regions in FIG. 7.

In a first example of the present application, referring to FIG. 7, the control unit establishes a positioning coordinate system so as to analyze the position of the self-moving lawn mower 10 and position information of the operation route of the self-moving lawn mower 10. The positioning assembly establishes the positioning coordinate system on a horizontal plane, uses a certain point as an origin, such as a position of a charging station or a starting position of the self-moving lawn mower 10, acquires the position information of the self-moving lawn mower 10 through the GPS positioning unit 310, the IMU 320 and other devices of the positioning assembly, converts the position information of the self-moving lawn mower 10 into data on corresponding position coordinates in the positioning coordinate system, and stores the data on the corresponding position coordinates in the storage module. The positioning assembly records the operation trajectory of the self-moving lawn mower 10, converts the operation trajectory into data on corresponding position coordinates, and stores the data on the corresponding position coordinates in the storage module. Through an analysis of trajectory data of the self-moving lawn mower 10, the non-operated region is calculated, and whether the non-operated region is the unmowed region is determined according to the area or shape of the non-operated region. When the self-moving lawn mower 10 is controlled to perform the supplementary operation, the self-moving lawn mower 10 is controlled to enter the unmowed region according to an analysis of the real-time position information of the self-moving lawn mower 10 and the position information of the unmowed region. After the self-moving lawn mower 10 enters the unmowed region, the mowing element 130 is controlled to rotate to mow. Referring to FIG. 4, the control unit 200 may generate a positioning coordinate system or an electronic map for analyzing the position and planned route of the self-moving lawn mower 10. Referring to FIG. 8, the filling planning module 210 stores an optimal route planning algorithm, analyzes, through the optimal route planning algorithm, supplementary operation routes for the unmowed regions, and analyzes a sequence in which the self-moving lawn mower 10 sequentially performs operation on the first unmowed region, the second unmowed region, and the N-th unmowed region to acquire a shortest operation route planned for the supplementary operation on the unmowed regions 430. In this manner, the self-moving lawn mower 10 completes the supplementary operation on all the unmowed regions with the highest efficiency and the shortest distance, or the self-moving lawn mower 10 performs the supplementary operation on the unmowed regions with relatively high efficiency and a distance whose deviation from the shortest operation route is less than 50%, improving the operation efficiency of the self-moving lawn mower 10. When the distance between unmowed regions 430 is calculated, a geometric center of the unmowed region may be selected as a mark point 431 of the unmowed region 430, or an outermost point of the unmowed region in a certain direction is selected as the mark point 431. Referring to FIG. 6, for example, the westernmost points of all the unmowed regions 430 are selected as the mark points 431, or any point in the unmowed region is selected as the mark point 431. A distance between mark points 431 of every two unmowed regions 430 is calculated so as to calculate the distance between unmowed regions. With the mark point 431 of the unmowed region 430 as a target point, the self-moving lawn mower 10 moves toward the unmowed region 430 under the guidance of position information of the mark point 431.

Due to the selection of different mark points 431 and the influence of obstacles, an error exists between the shortest operation route and an actual operation route along which the self-moving lawn mower 10 moves according to the shortest operation route and. In this example, a shortest route which is calculated by the filling planning module and along which the mowing is sequentially performed in the at least one unmowed region among all the unmowed regions is defined as the shortest operation route, and a ratio of a length of the actual operation route of the self-moving lawn mower 10 to a length of the shortest operation route is greater than or equal to 1 and less than or equal to 1.2. In one case, the ratio of the length of the operation route to the length of the shortest operation route is greater than or equal to 1 and less than or equal to 1.1.

In this example, the shortest operation route refers to a sequence in which the supplementary operation is performed on the unmowed regions, and different mark points 431 selected correspond to different lengths of supplementary operation routes. Therefore, an actual operation distance of the shortest operation route may be within an interval.

When the self-moving lawn mower 10 performs the supplementary operation on the unmowed regions, the control module 260 controls the self-moving lawn mower 10 to sequentially perform the supplementary operation on the unmowed regions according to a sequence in which the supplementary operation is performed on the unmowed regions along the shortest operation route. The self-moving lawn mower 10 enters the unmowed region, and the mowing element is driven to rotate to perform the mowing operation. The self-moving lawn mower 10 is controlled to move along a circle to operate or move in a zigzag shape to operate in the unmowed region or operate disorderly within a certain range. After a coverage rate of the supplementary operation the self-moving lawn mower is controlled to perform on the unmowed region is greater than 80%, it is determined that the supplementary operation on the unmowed region is completed. That is, a ratio of a coverage area of the operation of the self-moving lawn mower 10 to a total area of the unmowed region before the operation of the self-moving lawn mower 10 is greater than 80%. When the self-moving lawn mower 10 moves between the unmowed regions, the self-moving lawn mower 10 may pass through other unmowed regions. The case where the coverage rate of the operation of the self-moving lawn mower 10 on the unmowed region through which the self-moving lawn mower 10 passes is not greater than 80% is not the supplementary operation mentioned in this method example. The filling planning module is equipped with a route planning algorithm, so as to calculate and generate the operation route along which the mowing is sequentially performed in the at least one unmowed region of all the unmowed regions, and the control module controls the self-moving lawn mower to perform the supplementary operation on the unmowed regions according to the calculated operation route.

The filling planning module is equipped with the route planning algorithm, so as to calculate and generate a shortest operation route along which the mowing is sequentially performed in the at least one unmowed region of all the unmowed regions. The route planning algorithm may be a tabu search, a Dijkstra's algorithm, a fuzzy logic algorithm, an artificial potential field method, a spatial discrete method, an A* algorithm, an ant colony optimization algorithm, or other algorithms. In this manner, the shortest operation route for the unmowed regions is calculated, where the shortest operation route for the unmowed regions may be understood as a sequence of selective operation on the unmowed regions, and the sequence of selective operation on the unmowed regions can achieve fastest supplementary operation for the unmowed regions. The shortest operation route for the unmowed regions may also be the shortest route along which the self-moving lawn mower is controlled to perform the supplementary operation on the unmowed regions, so as to improve the speed of the supplementary operation.

A method for calculating the shortest operation route based on the route planning of the filling planning module 210 is provided. Simulation actuators are generated in the positioning coordinate system or the electronic map. The filling planning module 210 calculates simulation routes between the unmowed regions and store the simulation routes as a first simulation route 441, a second simulation route 441, an N-th simulation route 441, and so on. The filling planning module 210 calculates simulation routes along which the simulation actuators pass through all the unmowed regions, that is, selects routes from the first simulation route, the second simulation route, and the N-th simulation route and sorts the routes so that each of the simulation routes covers all the unmowed regions, where total simulation routes include a first simulation route, a second simulation route, and an N-th simulation route, and different simulation routes correspond to different sequences of the first simulation route, the second simulation route, and the N-th simulation route. By way of example, the simulation route does not need to include all the simulation routes 441, but cover all the unmowed regions. One of the first simulation route, the second simulation route, and the N-th simulation route is the shortest operation route 440 corresponding to the shortest route for operation on all to-be-operated regions 410.

According to a preset ant colony optimization algorithm in the filling planning module 210, the simulation actuators move along the first simulation route, the second simulation route, and the N-th simulation route 441 multiple times, and a mark factor is added to the simulation route 441 every time the simulation actuator moves along the simulation route 441, where the mark factor is a pheromone, and simulation routes with different mark factor concentrations correspond to different selection probabilities of the simulation actuators.

Here, a method for analyzing the shortest operation route 440 is provided. The filling planning module 210 generates m simulation actuators. One simulation actuator is used as an example. The simulation actuator selects a certain unmowed region as a starting point, and a transition probability from an unmowed region i to an unmowed region j is P. Optionally, multiple simulation actuators may be provided. The filling planning module 210 generates multiple simulation actuators at the same time so that the simulation actuators select the unmowed regions for transition according to the transition probability P, and thus the shortest operation route is simulated and calculated.

The simulation actuators select a next unmowed region according to the transition probability. After the simulation actuators mark all the unmowed regions, the filling planning module 210 adds or volatilizes the mark factor according to the selection of the simulation routes 441 by the simulation actuators. The mark factor concentration is determined according to an information concentration function $\tau$. The filling planning module 210 refreshes mark factors according to the information concentration function $\tau$, increases a mark factor of the selected simulation route 441, and volatilizes a mark factor of the unselected simulation route 441 to reduce the number of mark factors of the unselected simulation route 441. The filling planning module 210 reads a distance of the simulation route 441 and uses a reciprocal of the distance of the simulation route 441 as a heuristic function $\eta$. The transition probability of the simulation actuator is positively correlated to the information concentration function τ and the heuristic function η.

The transition probability P of the simulation actuator from the unmowed region i to the unmowed region j is a ratio of a product of the heuristic function η and the information concentration function τ to transition probabilities P from the unmowed region i to the unmowed regions (a sum of products of heuristic functions η and information concentration functions τ). The unmowed region through which the simulation actuator has passed will be passed through with a reduced probability. The information concentration function τ is calculated from a sum of an information enhancement function and an information volatilization function. The information volatilization function has a volatilization coefficient such as 0.5. In this manner, in a single route simulation, the mark factor of the simulation route 441 through which the simulation actuator has passed is increased by Δτ according to the information enhancement function, a cumulative mark factor function is a sum of 50% of the previous number of mark factors and an information enhancement amount Δτ, and the mark factor concentration of a route through which the simulation actuator has not passed is reduced by 50%.

Figure 9:
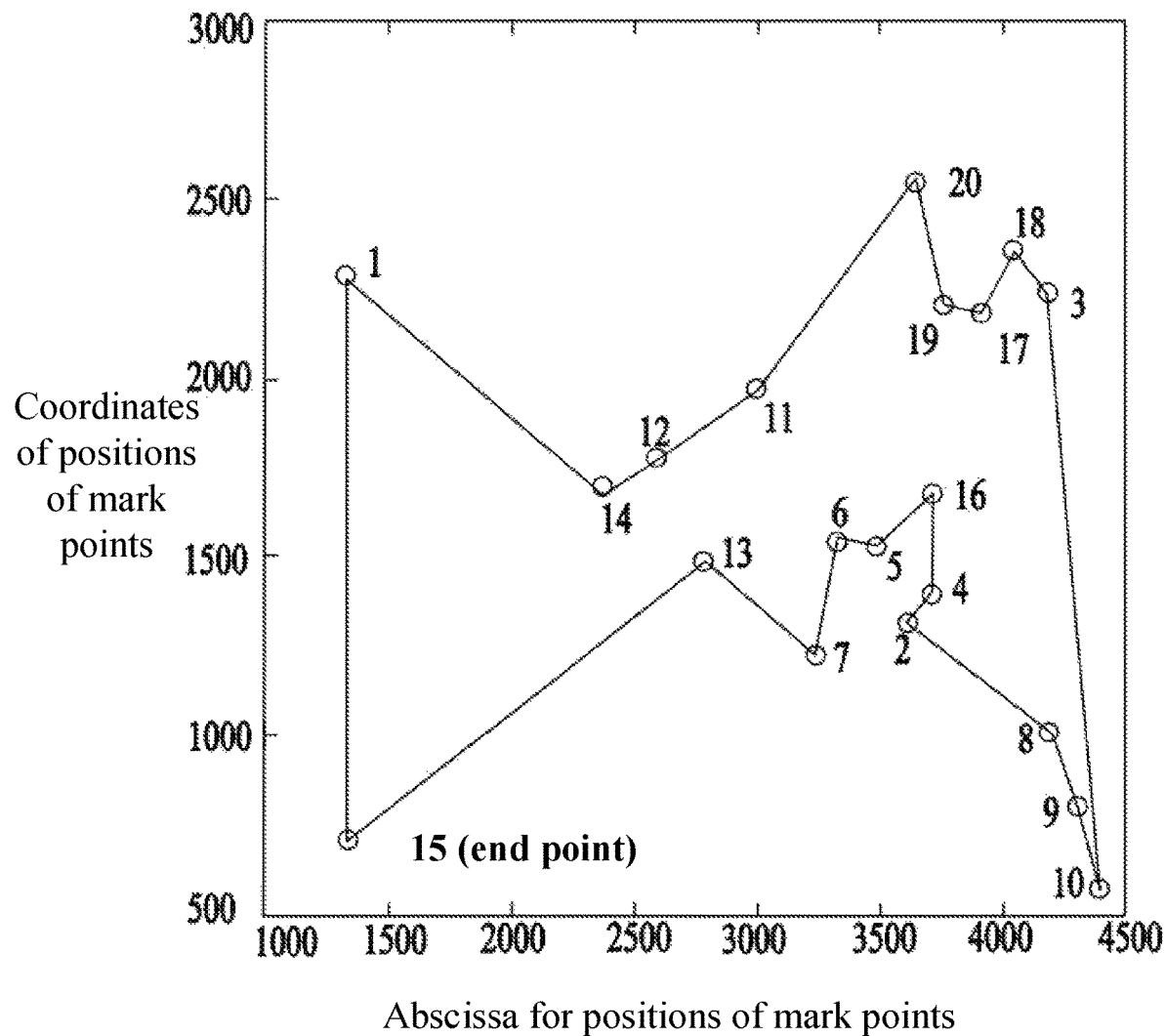
FIG. 9 is a schematic diagram of one iteration of simulated calculations of a shortest operation route by a self-moving mowing system.

FIG. 9 is a schematic diagram of one iteration of simulated calculations of the shortest operation route by the self-moving mowing system. After the simulation actuator completes one transition, the mark factor of the simulation route 441 is updated according to a preset algorithm, the unmowed region through which the simulation actuator has passed is changed to the operated region, each simulation actuator is assigned with a next unmowed region according to the transition probability P, and the preceding actions are repeated until all the unmowed regions have been selected for the simulation actuator to pass through. It is determined that the simulation actuator simulates one simulation route, the number of mark factors is updated according to the information concentration function τ, and after all the m simulation actuators complete the simulation routes, the information concentration functions τ are updated for the simulation routes, and the preceding actions are repeated and iterative calculations are performed until the simulation actuators repeat a certain simulation route more than A (a preset value) times or perform the iterative calculations more than B (a preset value) times under the guidance of the mark factors. For example, the simulation actuators repeat a certain simulation route more than (a preset value) 50 times or perform the iterative calculations more than 100 (a preset value) times under the guidance of the mark factors, and the most frequently selected simulation route is determined to be the shortest operation route 440.

Figure 10:
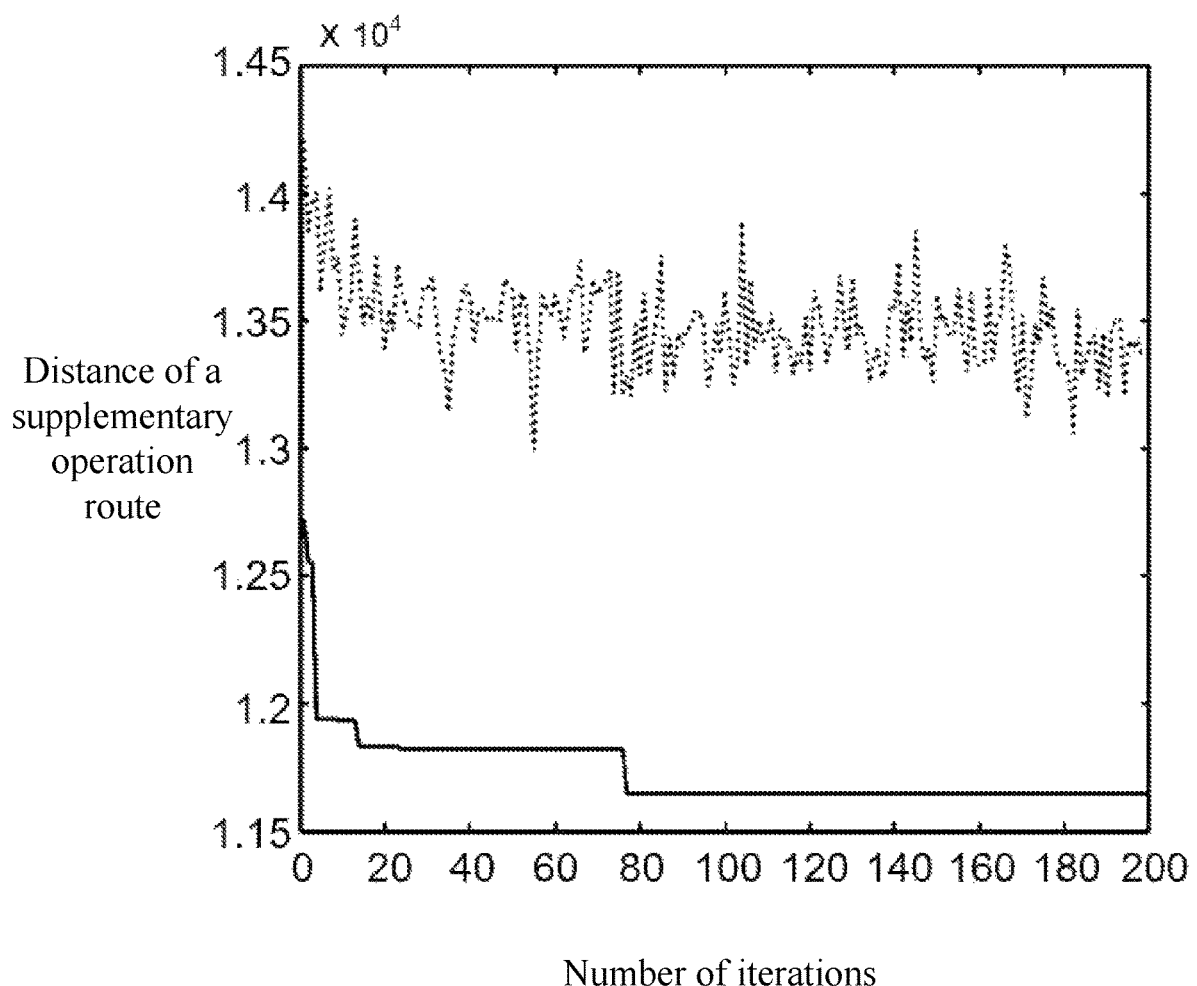
FIG. 10 is a schematic diagram of iterative convergence of calculations of a shortest operation route by a self-moving mowing system.

FIG. 10 is a schematic diagram of iterative convergence of calculations of the shortest operation route by the self-moving mowing system. Dashed points in the figure indicate the distance statistics of simulation operation routes of all the simulation actuators of the self-moving mowing system, and a solid line indicates the distance statistics of a simulation operation route of one simulation actuator of the self-moving mowing system in this example. After 80 iterations, the shortest operation route for the supplementary operation for the unmowed regions in the current operation situation is obtained.

In an example, the information enhancement amount Δτ is a ratio of a constant to a distance of the current simulation route 441, that is, the information enhancement amount Δτ is calculated through an ant-cycle system. In the case where the simulation route 441 is not selected for the simulation actuator to pass through, the information enhancement amount Δτ is 0. The information enhancement amount Δτ may also be calculated through an ant-quantity system or an ant-density system, which will not be described in detail here.

The transition probability P may be calculated by the following formula:

$$P_{ij}^{k}(t) = \begin{cases} \dfrac{[\tau_{ij}(t)]^{\alpha} \cdot [\eta_{ij}(t)]^{\beta}}{\sum\limits_{s \in J_k(i)} [\tau_{is}(t)]^{\alpha} \cdot [\eta_{is}(t)]^{\beta}} & \text{if } j \in J_k(i) \\ 0 & \text{if not} \end{cases} \quad (1)$$

where α denotes a mark factor index, β denotes a heuristic index, and $J_k$ denotes an unmowed region.

The information concentration function τ and the information enhancement amount Δτ are respectively expressed by the following formulas:

$$\tau_{ij}(t+n) = (1-\rho) \cdot \tau_{ij}(t) + \Delta\tau_{ij}(t) \quad (2)$$

$$\Delta\tau_{ij}(t) = \sum_{k=1}^{m} \Delta\tau_{ij}^{k}(t) \quad (3)$$

where ρ denotes a mark factor volatilization coefficient.

In another example, the optimal route planning algorithm in the filling planning module 210 adopts the A* algorithm, and the simulation actuator is generated in the positioning coordinate system or the electronic map. The filling planning module 210 calculates the simulation routes for the unmowed regions, and calculates one of the first simulation route, the second simulation route, and the N-th simulation route as the shortest operation route 440 corresponding to the shortest route for the operation on all the to-be-operated regions 410. The filling planning module 210 establishes a heuristic cost function F=G+H, where F denotes a total movement cost, G denotes a movement cost from a parent node to a current block, and H denotes a movement cost from the current block to an end point. A solution with the smallest cost is selected for each step so that the preceding shortest operation route is calculated.

When an obstacle exists between two unmowed regions, the operation route planning of the filling planning module 210 for the supplementary operation may adopt the artificial potential field method: a potential field function is established with a target point as a gravitational force and the obstacle as a repulsive force; or a dynamic window approach (DWA) method is adopted so as to obtain a shortest simulation route for the unmowed regions 430. In conjunction with the sequence in which the supplementary operation is performed on the unmowed regions 430 along the shortest operation route, a shortest operation distance of the shortest simulation route is obtained.

Figure 11:
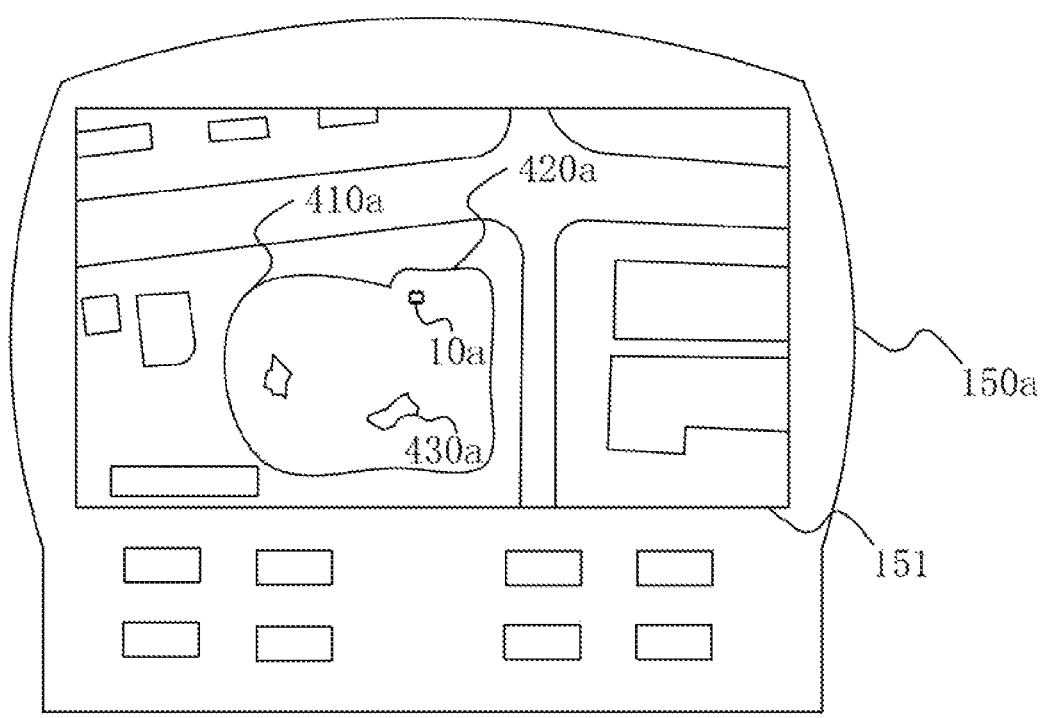
FIG. 11 is a structural diagram of an interactive interface of a self-moving mowing system in a second example of the present application.
Figure 12:
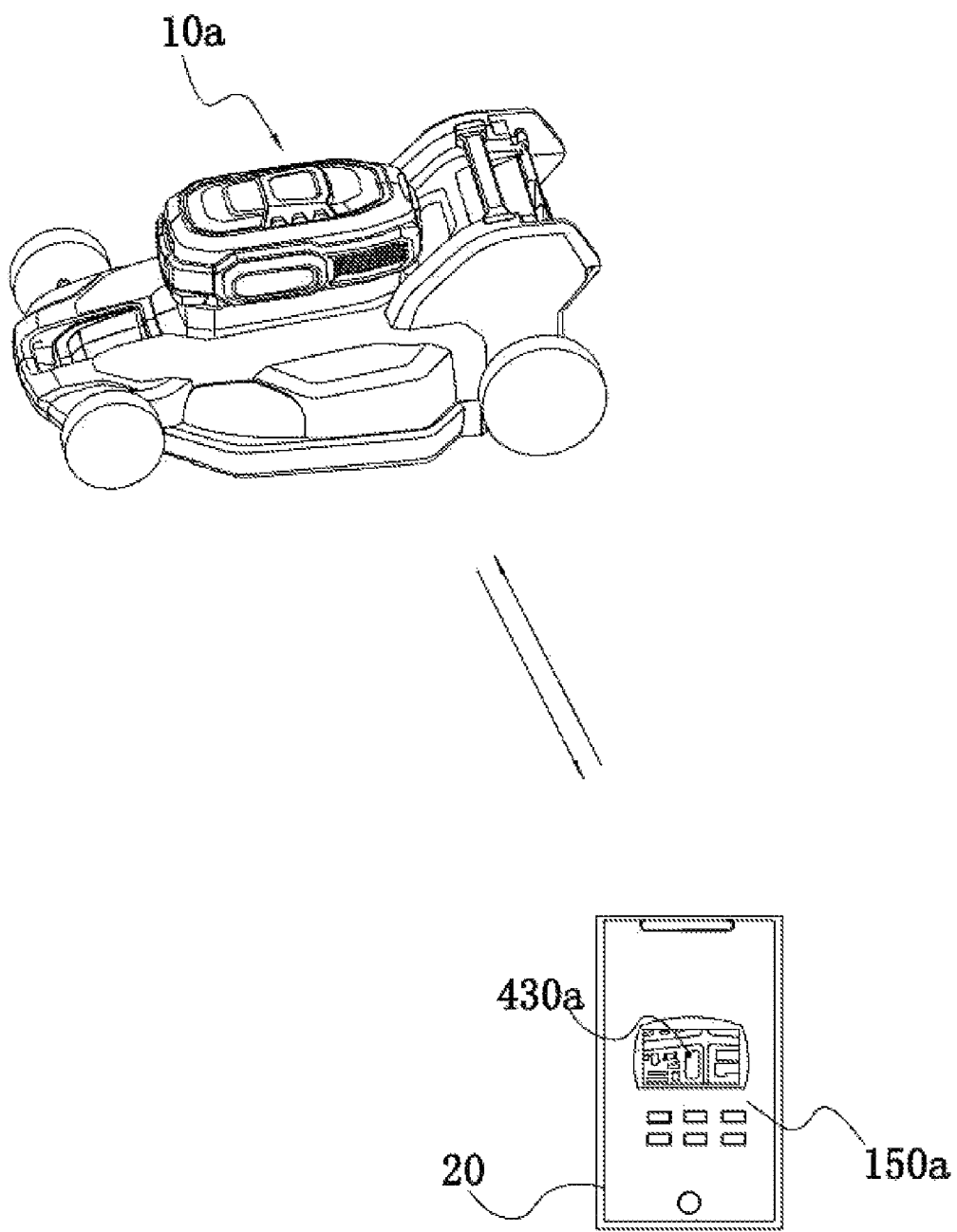
FIG. 12 is a schematic diagram of communication between a mobile device and a self-moving mowing system in a second example of the present application.

In a second example of the present application, referring to FIGS. 11 and 12, the self-moving mowing system is provided with the interactive interface 150 for interaction with the user. The interactive interface 150 is communicatively connected to the control unit, may display operation state information of the self-moving mowing system, and is provided with buttons or switches for the user to control the start and operation of the self-moving mowing system. The interactive interface 150 is connected to the control unit. When the user transmits a control instruction through the buttons or switches, the control unit acquires and analyzes the control instruction and outputs a corresponding control instruction to a corresponding controller so as to control the operation of the self-moving mowing system. The interactive interface 150 may be installed in a mobile terminal 20 and provide the user with the operation state information of the self-moving mowing system through the mobile terminal 20, and the user transmits the control instruction through the mobile terminal 20 to control the operation state of the self-moving mowing system.

The control unit generates an electronic map 151 to analyze a position of a self-moving lawn mower 10a and position information of an operation route of the self-moving lawn mower 10a. The electronic map may be displayed to the user through the interactive interface 150. The positioning assembly 300 acquires a real-time position and an operation trajectory of the self-moving lawn mower 10a, generates a corresponding virtual self-moving lawn mower 10a and the operation trajectory on the electronic map 151, analyzes a corresponding non-operated region, that is, an unmowed region 430a as the self-moving lawn mower 10a is operating, and generates a corresponding virtual unmowed region on the electronic map 151. The control unit generates the electronic map 151 and stores information content of the electronic map 151 in the storage module so that the electronic map 151 is provided in the control unit to operate. The control unit matches an operation region 410a of the self-moving lawn mower 10a to the electronic map 151 so that an operation boundary 420a of the operation region 410a of the self-moving lawn mower 10a is selected through an operation on the electronic map 151 and displayed in the electronic map 151. The control unit includes an electronic map control. The electronic map control includes world electronic map information or regional electronic map information or can load one of or a combination of online electronic map information and offline electronic map information. The electronic map control is configured to be capable of extracting the regional electronic map information. It should be understood by those skilled in the art that any positional point displayed in the electronic map 151 corresponds to international standard longitude and latitude data information, and longitude and latitude data information of any positional point in a regional map displayed in the electronic map 151 is stored in the electronic map control or on a cloud, that is, longitude and latitude data of an actual position corresponding to a positional point displayed in the electronic map 151 may be acquired through the electronic map control. The electronic map control is implemented as a G-Map control. The G-Map control is a loading processing tool of the electronic map 151 in the related art. The display content and operation data information of the electronic map 151 are initialized and loaded and display information of the electronic map 151 such as a display center point, a zoom level, a resolution, and a view type are set through the G-Map control. The boundary acquisition module and the electronic map control may be communicatively connected. The user selects the boundary of the operation region on the electronic map 151 and corresponds the boundary of the operation region to the boundary of the actual operation region so that the boundary acquisition module acquires the operation boundary of a region to be operated.

The unmowed region determination module analyzes the non-operated region according to the operation trajectory of the self-moving lawn mower 10a, and the filling planning module determines whether the non-operated region is the unmowed region 430a, projects the region to be operated on the electronic map 151, generates the virtual unmowed region on the electronic map 151, analyzes the boundary of the unmowed region, generates the boundary of the virtual unmowed region on the electronic map 151, and determines whether the non-operated region is the unmowed region. When the positioning assembly 300 detects that the position of the virtual self-moving lawn mower 10a is within the boundary of the virtual unmowed region, that is, the positioning assembly 300 detects that the position of the self-moving lawn mower 10a is within the boundary of the unmowed region, it is determined that the self-moving lawn mower 10a moves to the first unmowed region and an instruction is transmitted to the output controller so that the output motor 131 drives the mowing element 130 to rotate so as to mow in the first unmowed region. The self-moving lawn mower 10a operates in the unmowed region 430a. The unmowed region determination module acquires whether the first unmowed region is completed, and when the operation of the self-moving lawn mower 10a on the first unmowed region is completed, it is determined that the supplementary operation for the first unmowed region is completed, the control unit controls the self-moving lawn mower 10a to face the second unmowed region, and the preceding steps are repeated until the operation on all unmowed regions 430a is completed.

The control unit correspondingly displays simulated unmowed regions through the electronic map 151, that is, the simulated unmowed regions correspond to the actual unmowed regions in position, and the electronic map 151 is displayed through the interactive interface so that the user can acquire a state of the unmowed region. Through the interactive interface, the user may selectively output information to add or delete the unmowed region. Exemplarily, the user observes a situation within the operation boundary to analyze a situation of the unmowed region, such as an operated region that actually needs to be added or whether an obstacle exists in the operation region, and the user analyzes and determines a position of the unmowed region on the electronic map 151 or in the positioning coordinate system, and selects a corresponding unmowed region on the electronic map 151 or in the positioning coordinate system through the interactive interface to add the unmowed region or delete the corresponding unmowed region selected by the system. The filling planning module generates a simulation actuator a configured to move and operate in the unmowed regions.

Figure 13:
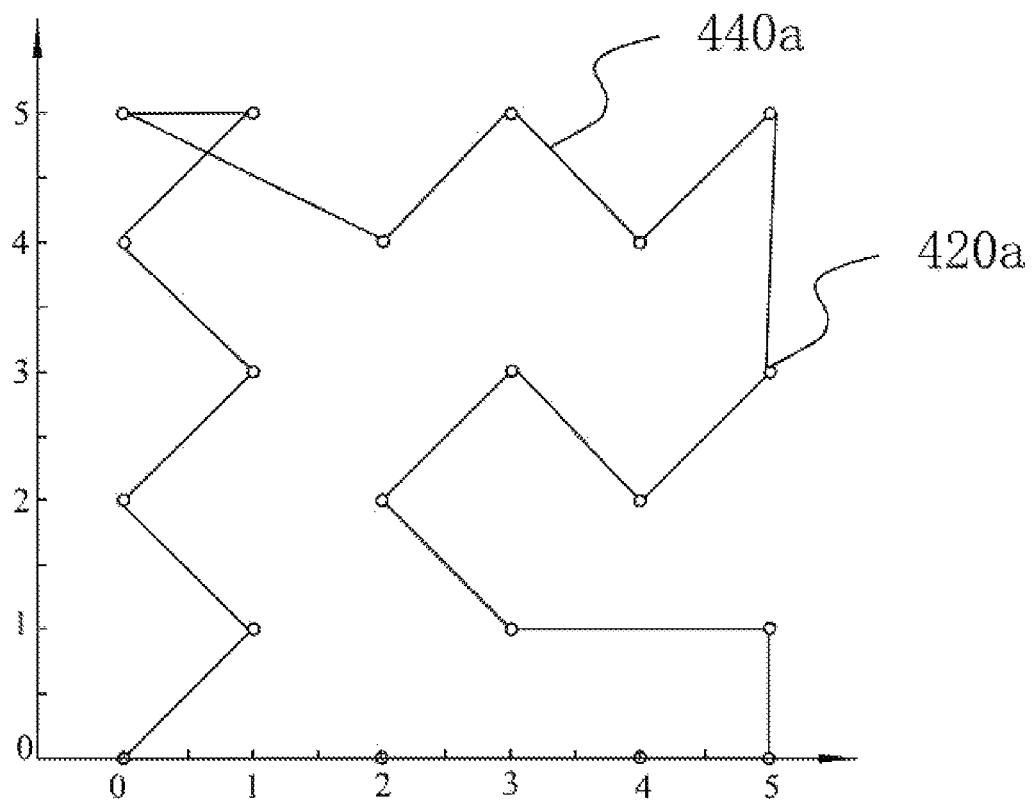
FIG. 13 is a schematic diagram of planning of a supplementary operation route according to a third example of the present application.

In a third example of the present application, the difference from the first example is that at the second operation stage, that is, when the supplementary operation is performed on the unmowed regions of the self-moving lawn mower, the control module is configured to control the self-moving lawn mower to mow in the at least one unmowed region among all the unmowed regions one by one. Referring to FIG. 13, the filling planning module plans a supplementary route 440b for unrepeated operation on the unmowed regions according to positions of unmowed regions 430b, and the control unit controls, according to a sequence in which the supplementary operation is performed on the unmowed regions 430b, the self-moving lawn mower to move and operate according to a trajectory of the supplementary operation route. In this manner, the self-moving lawn mower sequentially moves and operates in the sequence of the unmowed regions so that the self-moving lawn mower performs the unrepeated operation on the unmowed regions and completes the supplementary mowing with high efficiency.

At the second operation stage, the positioning assembly of the self-moving mowing system acquires real-time positioning of the self-moving lawn mower. A moving speed and steering of the self-moving lawn mower are controlled sequentially according to position information of the unmowed regions 430b stored in the storage module, and the self-moving lawn mower is controlled to operate in the corresponding unmowed regions 430b, where the unmowed regions 430b in the figure may also be understood as mark points. For example, at the second operation stage, the control unit drives the self-moving lawn mower to move toward a certain unmowed region. By analyzing a distance between the current position of the self-moving lawn mower and the first unmowed region, the control unit causes the first moving wheel and the second moving wheel to rotate at different speeds through the drive controller and causes the self-moving lawn mower to steer and move toward the first unmowed region through the differential rotation of the first moving wheel and the second moving wheel.

When the positioning assembly detects that the position of the self-moving lawn mower overlaps with the first unmowed region, it is determined that the self-moving lawn mower moves to the first unmowed region and an instruction is transmitted to the output controller so that the output motor drives the mowing element to rotate so as to mow in the first unmowed region. The unmowed region determination module acquires whether the first unmowed region is completed, and when the operation of the self-moving lawn mower in the first unmowed region is completed, it is determined that the supplementary operation for the first unmowed region is completed, the control unit controls the self-moving lawn mower to face the second unmowed region, and the preceding steps are repeated until the operation on all the unmowed regions 430b is completed and mowing is not repeated in each unmowed region. In this manner, the operation efficiency of the self-moving lawn mower is improved, and the supplementary mowing is effectively performed on unmowed regions of the self-moving lawn mower at an early stage so that the lawn mowed by the self-moving mowing system is more beautiful and energy is saved. In a manner of planning the supplementary operation route for the unmowed regions, the filling planning module is equipped with an algorithm, a point closest to the self-moving lawn mower is selected as a starting point, and an unmowed region that is closest to a previous unmowed region or the starting point is selected as a next unmowed region until all the unmowed regions are selected, and the corresponding supplementary operation route is generated according to a sequence in which the unmowed regions are selected. Therefore, the control module is configured to: after the self-moving lawn mower is controlled to perform the supplementary operation on the N-th unmowed region, select an M-th unmowed region on which the supplementary operation is not performed and which has a smallest distance from the N-th unmowed region as a next unmowed region on which the supplementary operation is performed. The self-moving lawn mower is controlled, according to the supplementary operation route, to perform the supplementary operation on the unmowed regions in the corresponding sequence to complete the supplementary operation on all the unmowed regions and the supplementary operation for each unmowed region is not repeated, thereby improving the operation efficiency of the self-moving lawn mower.

Figure 14:
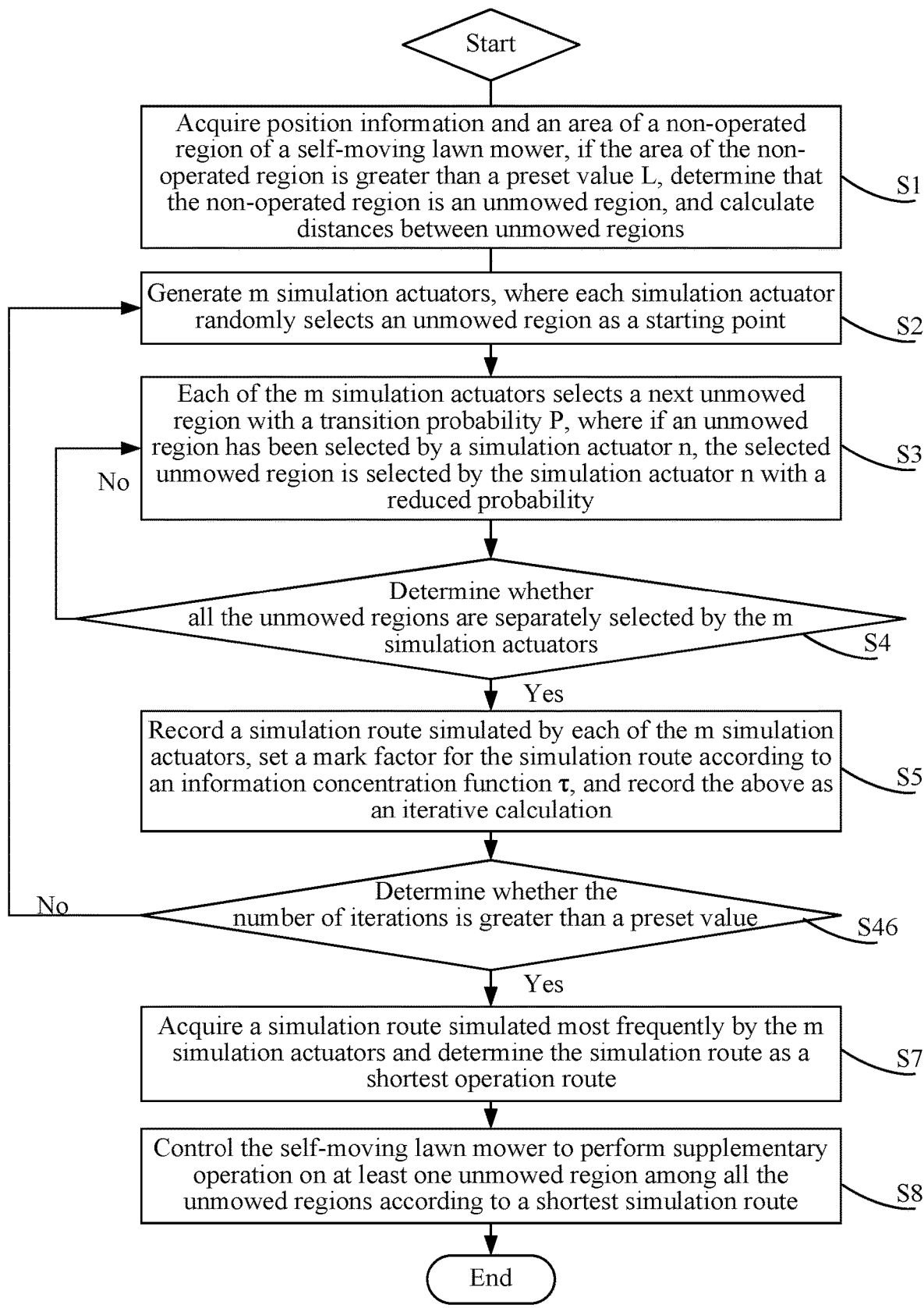
FIG. 14 is a flowchart of a method for a self-moving mowing system to perform supplementary operation on an unmowed region along an optimal route.

Referring to FIG. 14, a method for the self-moving lawn mower 10 to perform the supplementary operation on the unmowed region 430 along an optimal route is provided. In S1, the position information and area of the non-operated region of the self-moving lawn mower 10 are acquired, if the area of the non-operated region is greater than a preset value L, it is determined that the non-operated region is the unmowed region, and the distances between the unmowed regions are calculated. In S2, the m simulation actuators are generated, where each simulation actuator randomly selects an unmowed region as the starting point. In S3, each of the m simulation actuators selects the next unmowed region with the transition probability P, where if an unmowed region has been selected by a simulation actuator n, the selected unmowed region is selected by the simulation actuator n with a reduced probability. In S4, whether all the unmowed regions are separately selected by the m simulation actuators is determined. If not, step S3 is repeated. If so, step S5 is performed. In S5, a simulation route simulated by each of the m simulation actuators is recorded, a mark factor is set for the simulation route according to the information concentration function $\tau$, and the above is recorded as an iterative calculation. In S6, whether the number of iterations is greater than a preset value is determined. If not, step S2 is repeated. If so, step S7 is performed. In S7, a simulation route simulated most frequently by m self-moving lawn mowers 10 is acquired and determined to be the shortest operation route 440. In S8, the self-moving lawn mower 10 is controlled to perform the supplementary operation on the at least one unmowed region among all the unmowed regions according to the shortest simulation route.

Figure 15:
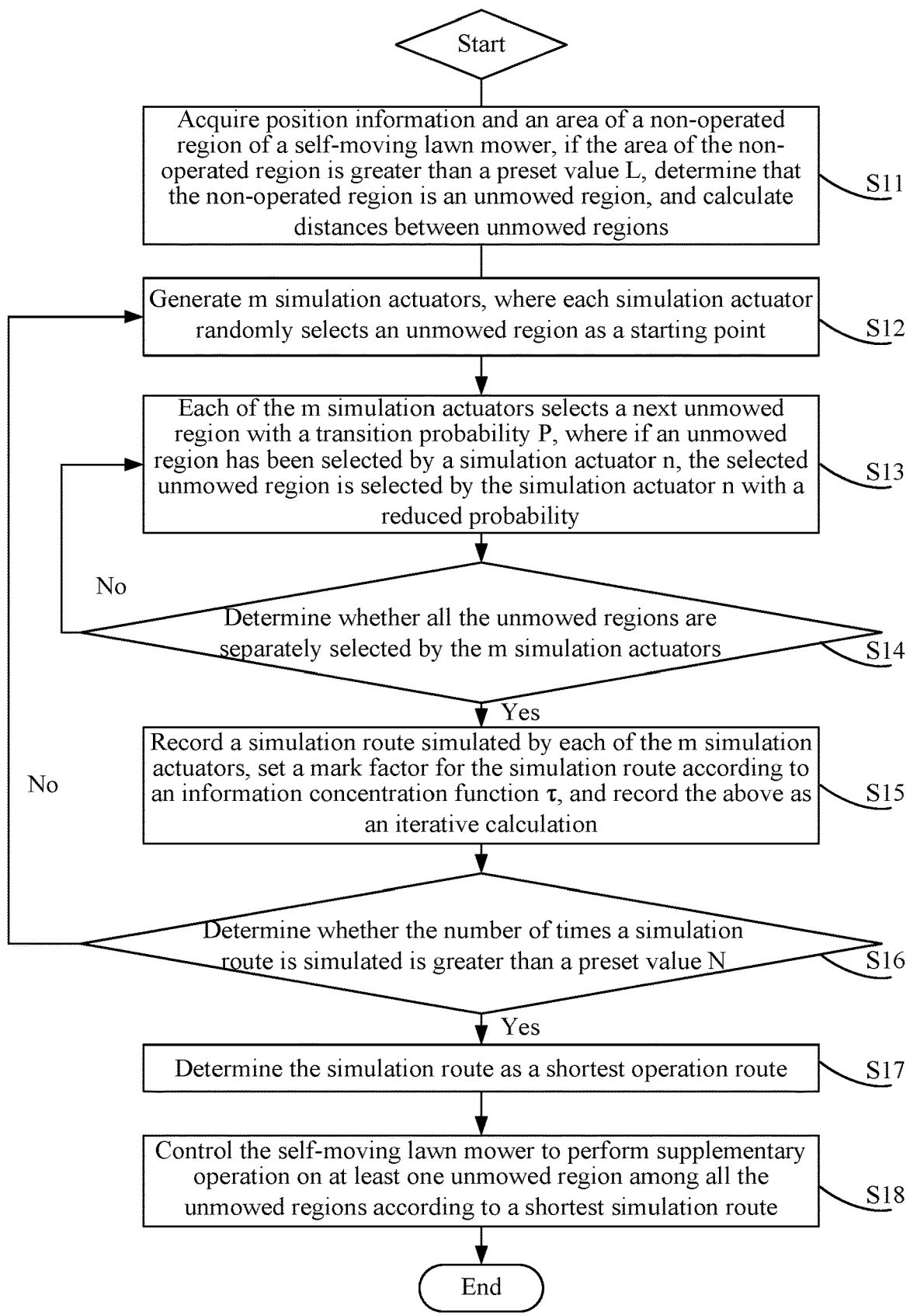
FIG. 15 is a flowchart of another method for a self-moving mowing system to perform supplementary operation on an unmowed region along an optimal route.
Figure 16:
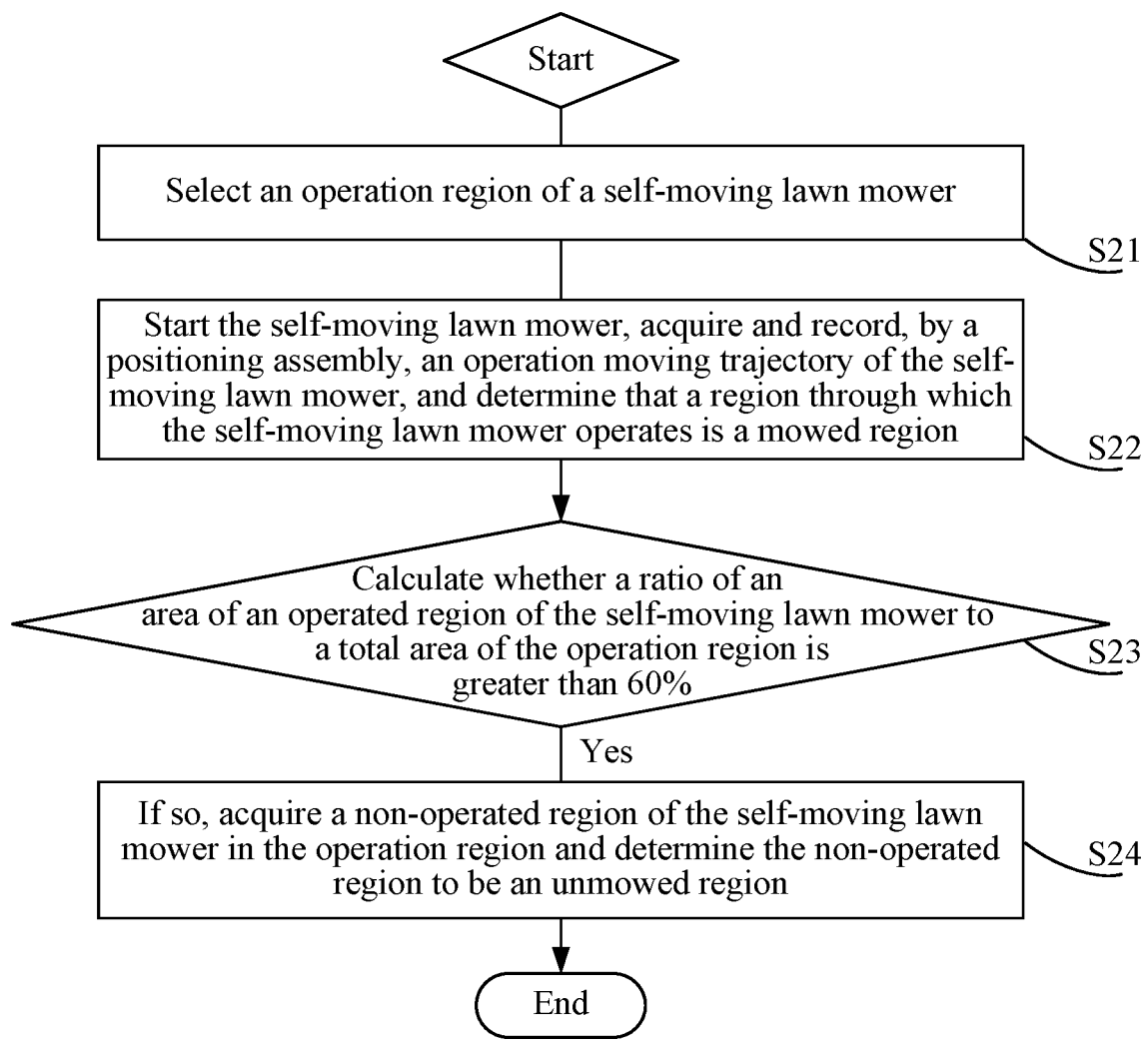
FIG. 16 is a flowchart of a method for identifying and determining an unmowed region of a self-moving mowing system.

Referring to FIG. 15, a method for the self-moving lawn mower 10 to perform the supplementary operation on the unmowed region 430 along an optimal route is provided. In S11, the position information and area of the non-operated region of the self-moving lawn mower 10 are acquired, if the area of the non-operated region is greater than a preset value L, it is determined that the non-operated region is the unmowed region, and the distances between the unmowed regions are calculated. In S12, the m simulation actuators are generated, where each simulation actuator randomly selects an unmowed region as the starting point. In S13, each of the m simulation actuators selects the next unmowed region with the transition probability P, where if an unmowed region has been selected by a simulation actuator n, the selected unmowed region is selected by the simulation actuator n with a reduced probability. In S14, whether all the unmowed regions are separately selected by the m simulation actuators is determined. If not, step S3 is repeated. If so, step S15 is performed. In S15, a simulation route simulated by each of the m simulation actuators is recorded, a mark factor is set for the simulation route according to the information concentration function $\tau$, and the above is recorded as an iterative calculation. In S16, it is determined whether the number of times a simulation route is simulated is greater than a preset value N. If not, steps S2 to S4 are repeated. If so, step S17 is performed. In S17, the simulation route is acquired and determined to be the shortest operation route. In S18, the self-moving lawn mower 10 is controlled to perform the supplementary operation on the at least one unmowed region among all the unmowed regions according to the shortest simulation route. To sum up, referring to FIG. 16, a method for identifying and determining the unmowed region 430 of the self-moving lawn mower 10 is provided. In S21, the operation region 410 of the self-moving lawn mower 10 is selected. In S22, the self-moving lawn mower 10 is started, the positioning assembly 300 acquires and records the operation moving trajectory of the self-moving lawn mower 10, and it is determined that a region through which the self-moving lawn mower 10 operates is the mowed region. In S23, whether the ratio of the area of the operated region of the self-moving lawn mower 10 to the total area of the operation region 410 is greater than a preset value M is calculated. In S24, if so, the non-operated region of the self-moving lawn mower 10 in the operation region 410 is acquired and determined to be the unmowed region 430. Optionally, the area of each non-operated region of the self-moving lawn mower 10 is calculated, where if the area of the non-operated region is greater than the preset value L, it is determined that the non-operated region is the unmowed region 430.

Figure 17:
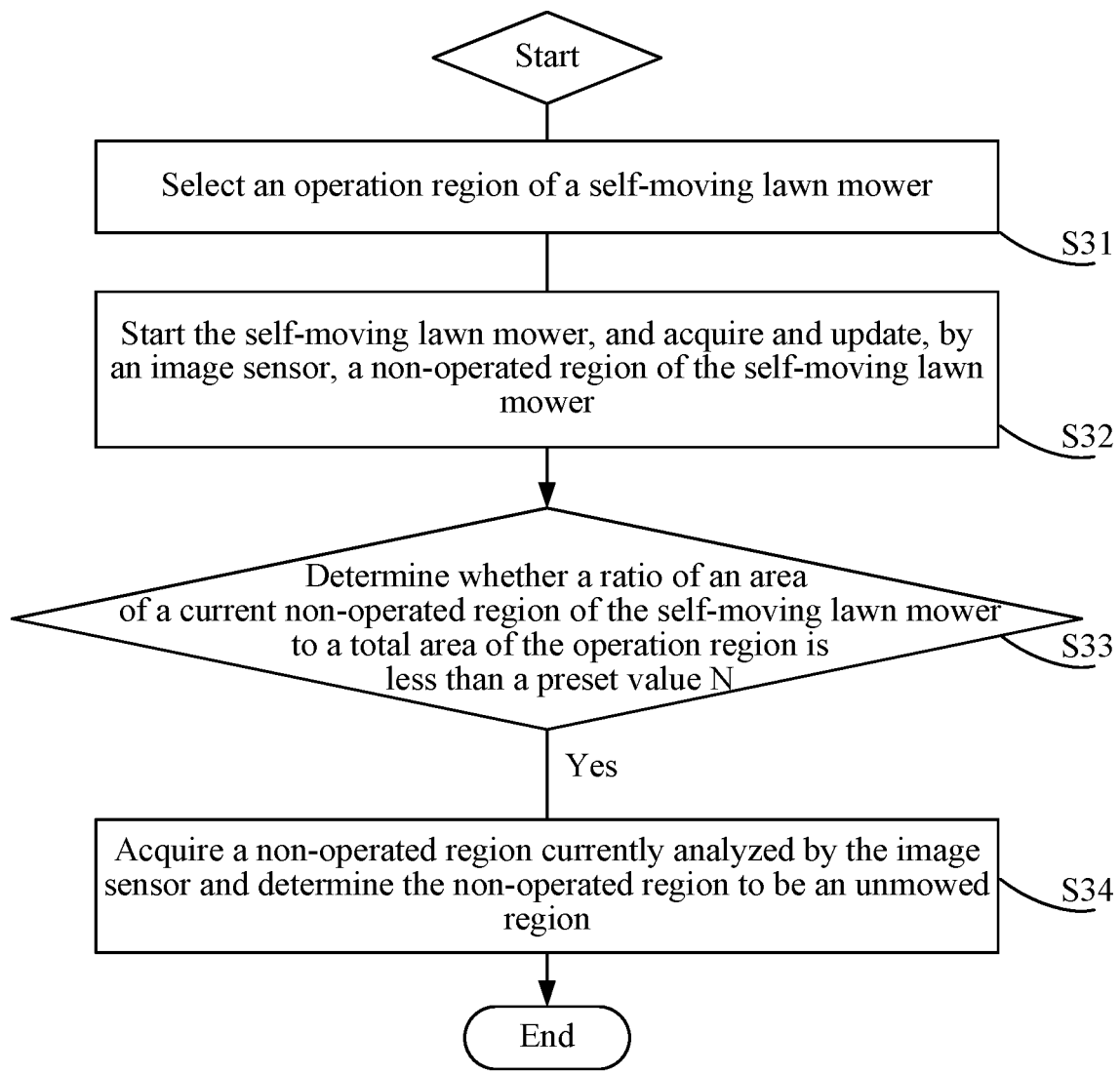
FIG. 17 is a flowchart of another method for identifying and determining an unmowed region of a self-moving mowing system.

Referring to FIG. 17, in another example, a method for identifying and determining the unmowed region 430 of the self-moving lawn mower 10 is provided. In S31, the operation region 410 of the self-moving lawn mower 10 is selected. In S32, the self-moving lawn mower 10 is started, and the image sensor 340 acquires and updates the non-operated region of the intelligent self-moving lawn mower 10. In S33, whether a ratio of an area of a current non-operated region of the self-moving lawn mower 10 to the total area of the operation region 410 is less than a preset value N is determined. In S34, if so, the non-operated region currently analyzed by the image sensor 340 is acquired and determined to be the unmowed region 430. The area of each non-operated region of the self-moving lawn mower 10 is calculated, where if the area of the non-operated region is greater than the preset value L, it is determined that the non-operated region is the unmowed region 430.

Figure 18:
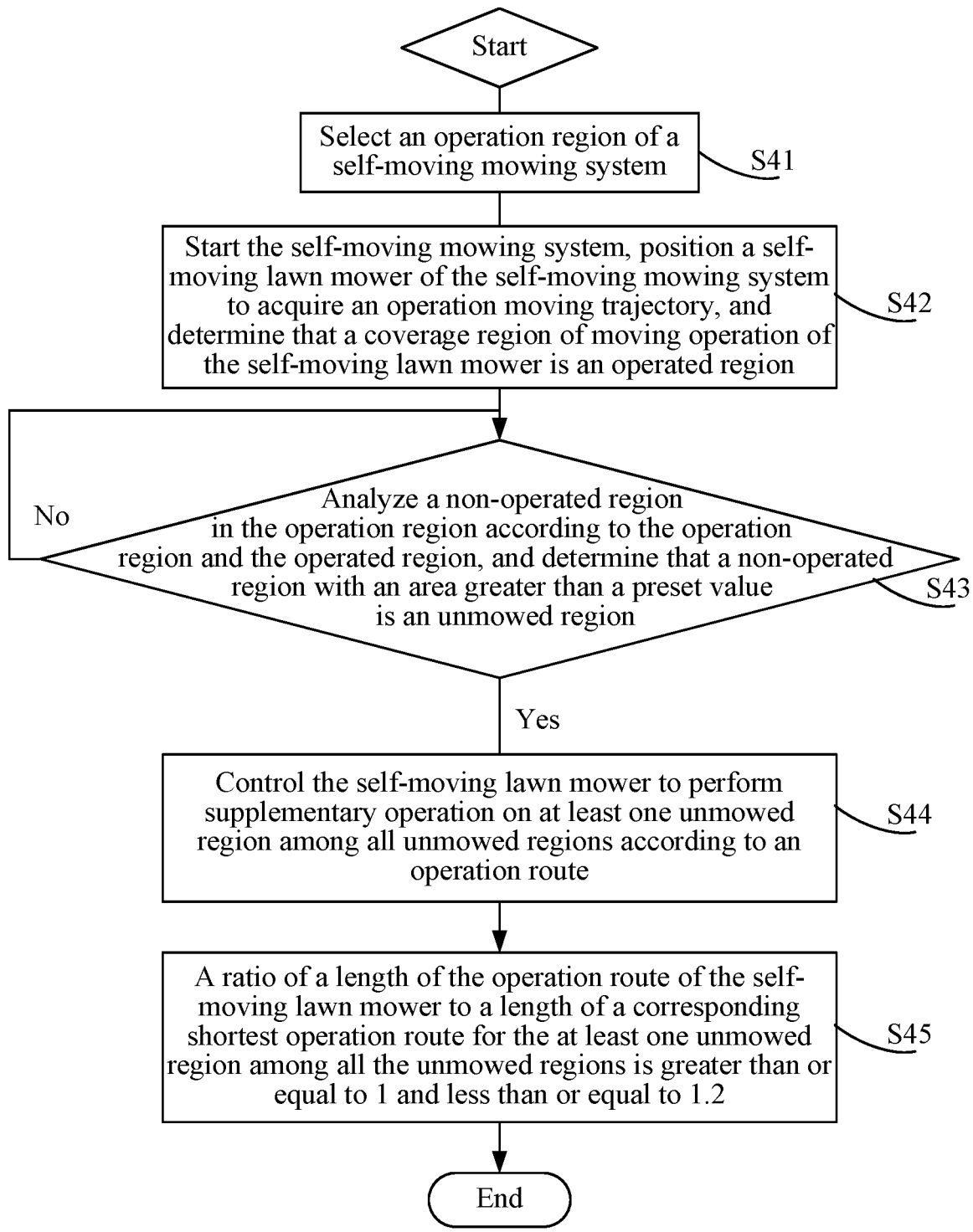
FIG. 18 is a flowchart of a supplementary operation method for an unmowed region of a self-moving mowing system.

Referring to FIG. 18, a supplementary operation method for the unmowed region 430 of the self-moving lawn mower 10 is provided. In S41, the operation region of the self-moving mowing system is selected. In S42, the self-moving mowing system is started, the self-moving lawn mower 10 of the self-moving mowing system is positioned so that the operation moving trajectory is acquired, and it is determined that a coverage region of moving operation of the self-moving lawn mower 10 is the operated region. In S43, the non-operated region in the operation region is analyzed according to the operation region and the operated region, and it is determined that the non-operated region with an area greater than the preset value is the unmowed region. In S44, if so, the non-operated region in the operation region is analyzed according to the operation region and the operated region, it is determined that the non-operated region with an area greater than the preset value is the unmowed region, and the operation route for the supplementary operation on the unmowed regions is planned according to the information about the unmowed regions; if not, step S43 is repeated. In S45, S44 is repeated until the ratio of the length of the operation route of the self-moving lawn mower 10 to the length of the corresponding shortest operation route for the at least one unmowed region among all the unmowed regions is greater than or equal to 1 and less than or equal to 1.2.

Figure 19:
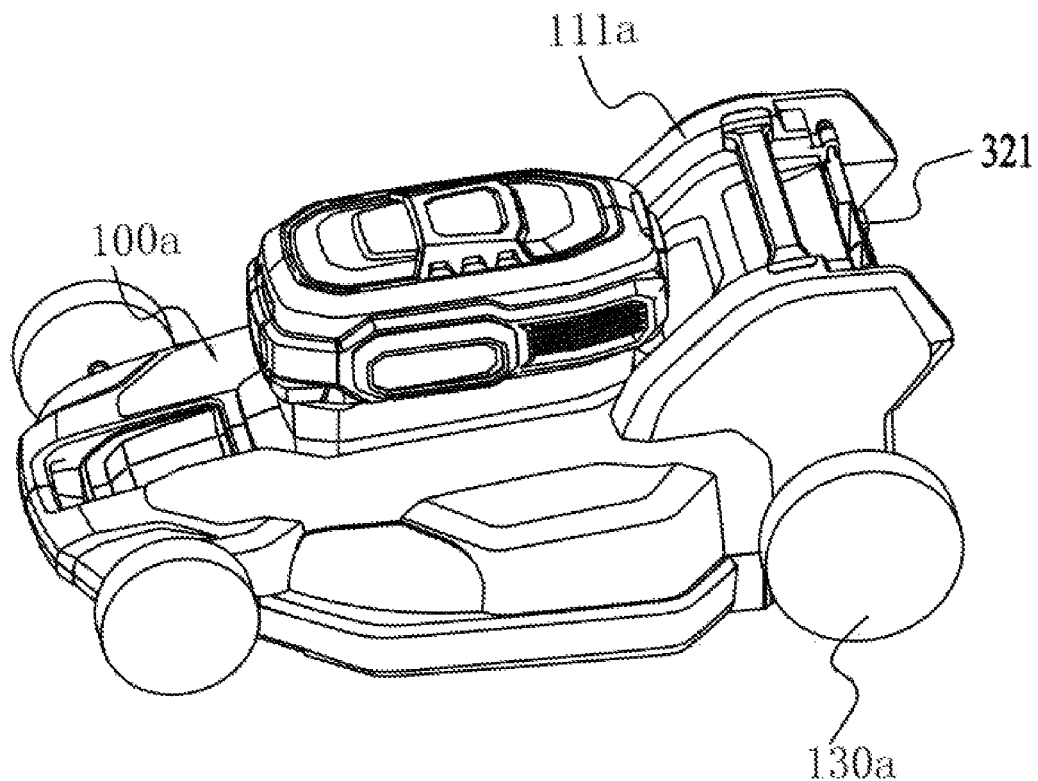
FIG. 19 is a perspective view of a self-moving lawn mower.
Figure 20:
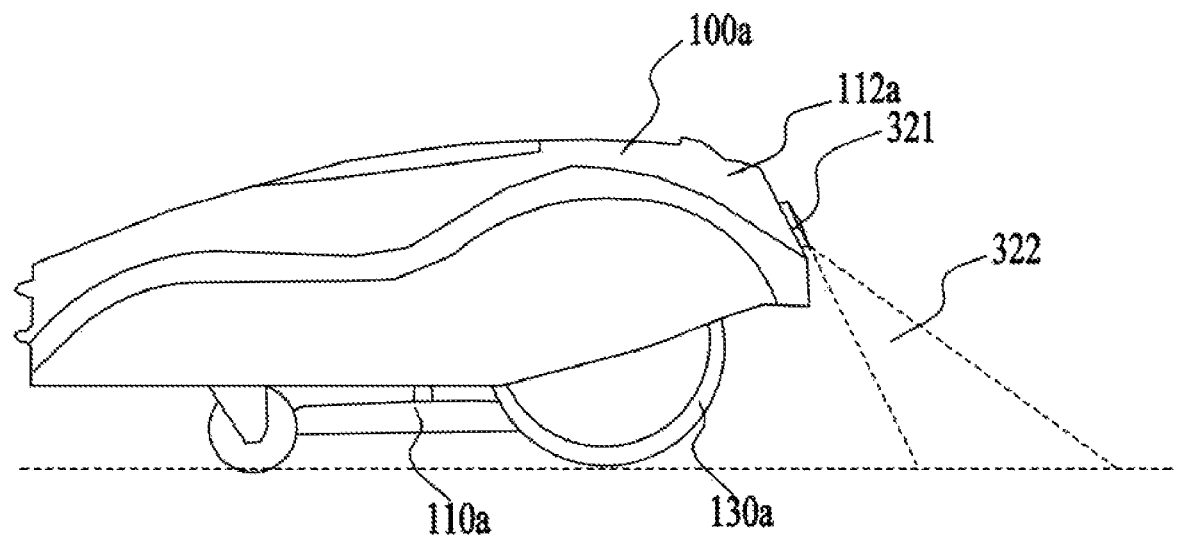
FIG. 20 is a schematic diagram illustrating operation of an image sensor of the self-moving lawn mower in FIG. 19.
Figure 21A:
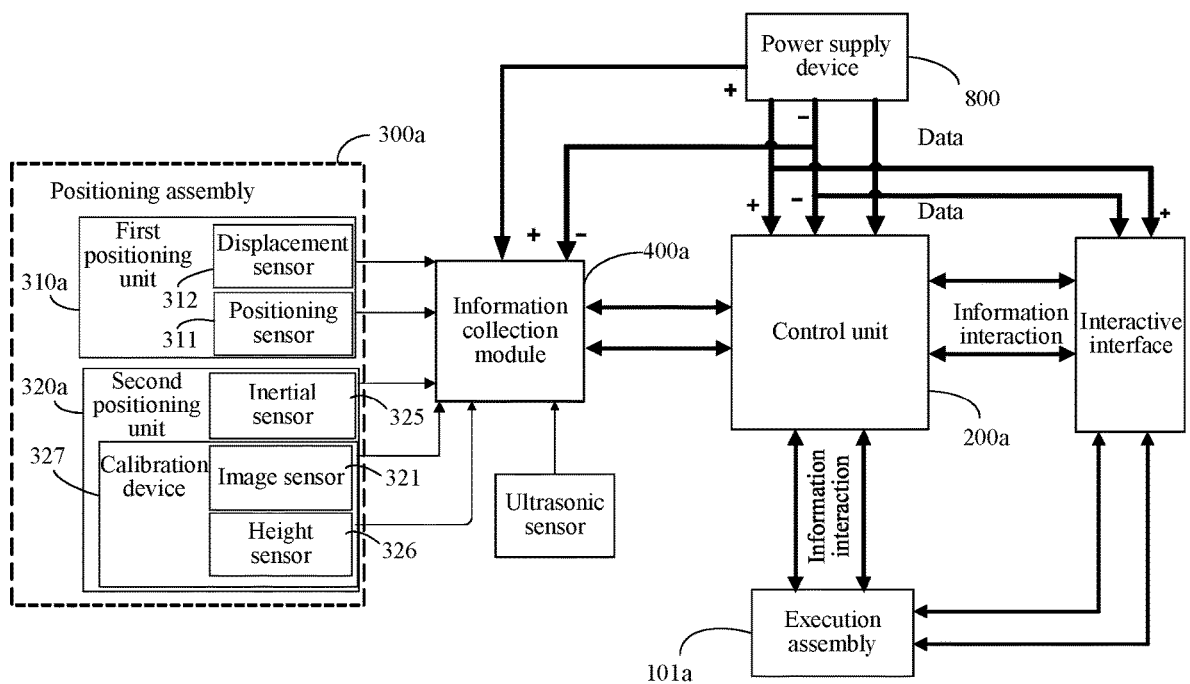
FIG. 21A is a diagram of structural modules of a self-moving lawn mower.
Figure 21B:
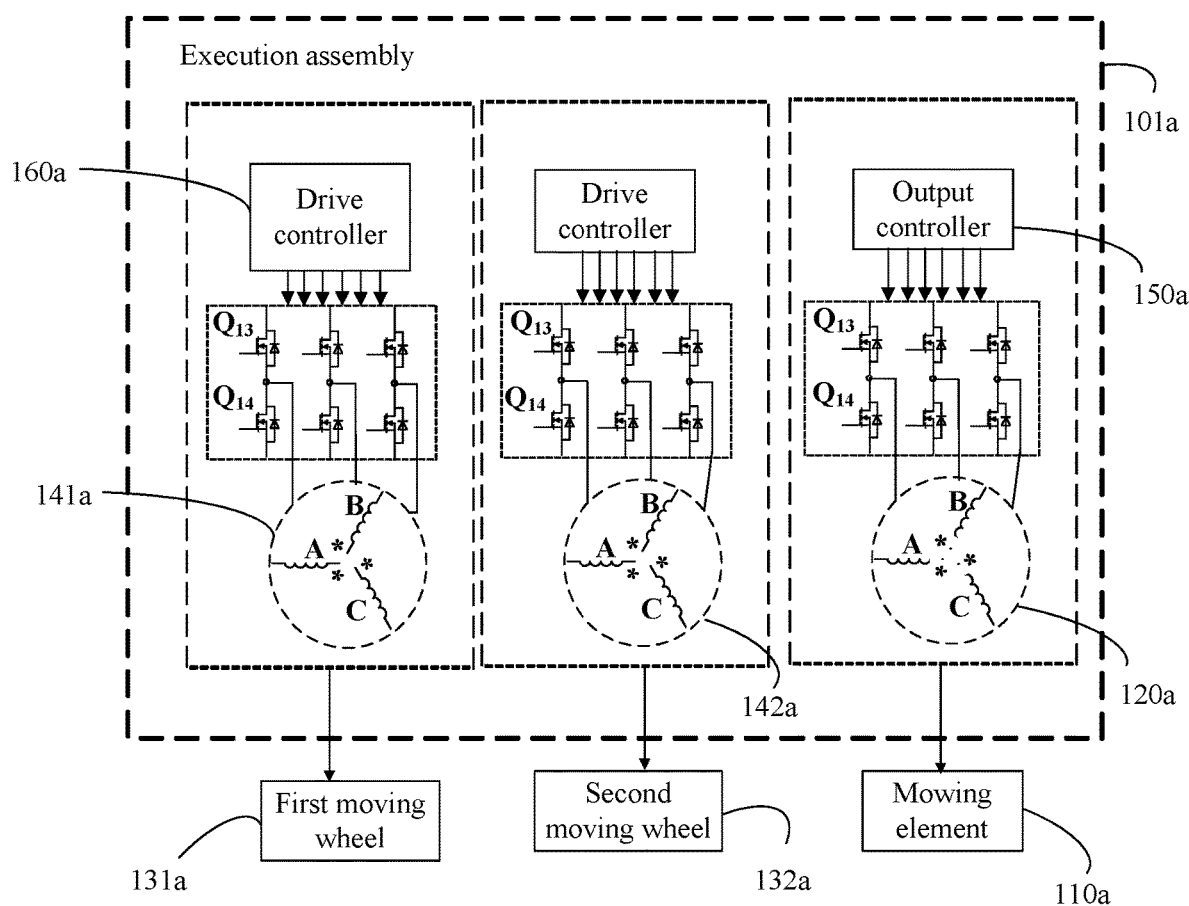
FIG. 21B is a diagram of structural modules of an execution assembly of a self-moving lawn mower.

In an example of the present application, to position the self-moving lawn mower to determine the position information of the unmowed regions of the self-moving lawn mower, a self-moving lawn mower is provided. Referring to FIGS. 19 to 21, the self-moving lawn mower includes at least a main body 100a and an execution assembly 101a connected to the main body 100a. The execution assembly 101a includes a mowing element 110a and an output motor 120a configured to drive the mowing element 110a to rotate. The mowing element 110a is disposed below the main body 100a. The mowing element 110a is driven to rotate by the output motor 120a and configured to cut vegetation. The execution assembly 101a includes moving wheels 130a and a drive motor 140a configured to provide a driving force to the moving wheels 130a for the moving wheels 130a to rotate. The self-moving lawn mower further includes a control unit 200a. The control unit 200a controls rotational speeds of the moving wheels 130a by controlling the drive motor 140a so as to control a moving state of the self-moving lawn mower. The self-moving lawn mower further includes a power supply device 800. Optionally, the power supply device 800 is implemented as at least one battery pack and is connected to the self-moving lawn mower through a battery pack interface on the self-moving lawn mower so as to supply power to the output motor 120a and the drive motor 140a. The self-moving lawn mower includes an output controller 150a configured to control the output motor 120a and a drive controller 160a configured to control the drive motor 140a. The output controller 150a is connected to the control unit 200a, and the control unit 200a is configured to transmit an instruction to control the output motor 120a to operate through the output controller 150a so as to control a cutting state of the mowing element 110a. The drive controller 160a is connected to the drive motor 140a and configured to control the drive motor 140a, and the drive controller 160a is communicatively connected to the control unit 200a so that after receiving a start instruction from a user or determining that the self-moving lawn mower is started, the control unit 200a analyzes a moving route of the self-moving lawn mower and transmits a moving instruction to the drive controller 160a so as to control the drive motor 140a to drive the moving wheels 130a to move.

The self-moving lawn mower is provided with a positioning assembly 300a configured to detect a position of the self-moving lawn mower and an information collection module 400a configured to collect position information of the self-moving lawn mower. The information collection module 400a is configured to determine a current mowed route of the lawn mower by acquiring the position information of the self-moving lawn mower detected by the positioning assembly 300a. The information collection module 400a is connected to the control unit 200a and configured to transmit the position information of the self-moving lawn mower to the control unit 200a. The positioning assembly 300a includes at least a first positioning unit 310a and a second positioning unit 320a. The first positioning unit 310a includes a positioning sensor 311. The positioning sensor 311 may be a GPS positioning assembly or a global navigation satellite system (GNSS) positioning assembly and configured to acquire primary position information or a main position estimation and a starting position of movement of the self-moving lawn mower. The second positioning unit 320a is configured to detect accurate position information of the self-moving lawn mower, that is, based on the primary position information acquired by the first positioning unit 310a, the second positioning unit 320a determines the accurate position information with a smaller error to acquire a final position estimation of the self-moving lawn mower. The first positioning unit 310a and the second positioning unit 320a transmit the detected position information to the information collection module 400a for the information collection module 400a to analyze a displacement state of the self-moving lawn mower. The GNSS positioning assembly is a global navigation satellite system, which includes GPS of the US, Beidou of China, GLONASS of Russia, GALILEO of the European Union, regional systems such as the Quasi-Zenith Satellite System (QZSS) of Japan and the Indian Regional Navigation Satellite System (IRNSS) of India, and augmentation systems such as WASS of the US, the Multi-functional Satellite Augmentation System (MSAS) of Japan, the European Geostationary Navigation Overlay Service (EGNOS) of the European Union, the GPS-aided GEO augmented navigation (GAGAN) of India, and NIG-GOMSAT-1 of Nigeria.

The second positioning unit 320a includes at least an image sensor 321. The image sensor 321 is disposed on the main body 100a. The image sensor 321 generates a corresponding image sensing region 322 and acquires an image in the image sensing region 322. The self-moving lawn mower moves to drive the image sensor 321 to move so that the image sensing region 322 moves so as to acquire different images. The image sensor 321 continuously or intermittently acquires images in the image sensing region 322 and acquires first positional image information 323 at a first time point and second positional image information 328 at a second time point thereafter. At least one common feature area of the first positional image information 323 and the second positional image information 328 is acquired. The common feature area includes one or more feature points. Displacement states of one or more common feature points are compared so that the displacement state or relative displacement state of the self-moving lawn mower on the ground is acquired. In an example of the present application, the common feature area may be a collection of points, lines, surfaces, or colors in the image, such as a histogram of oriented gradients (HOG) feature, an Hddr feature, and a Large Electron-Positron Collider (LEP) feature, and an actual displacement of the self-moving lawn mower within the corresponding time is analyzed through a temporal moving trajectory of the common feature area.

Figure 28A:
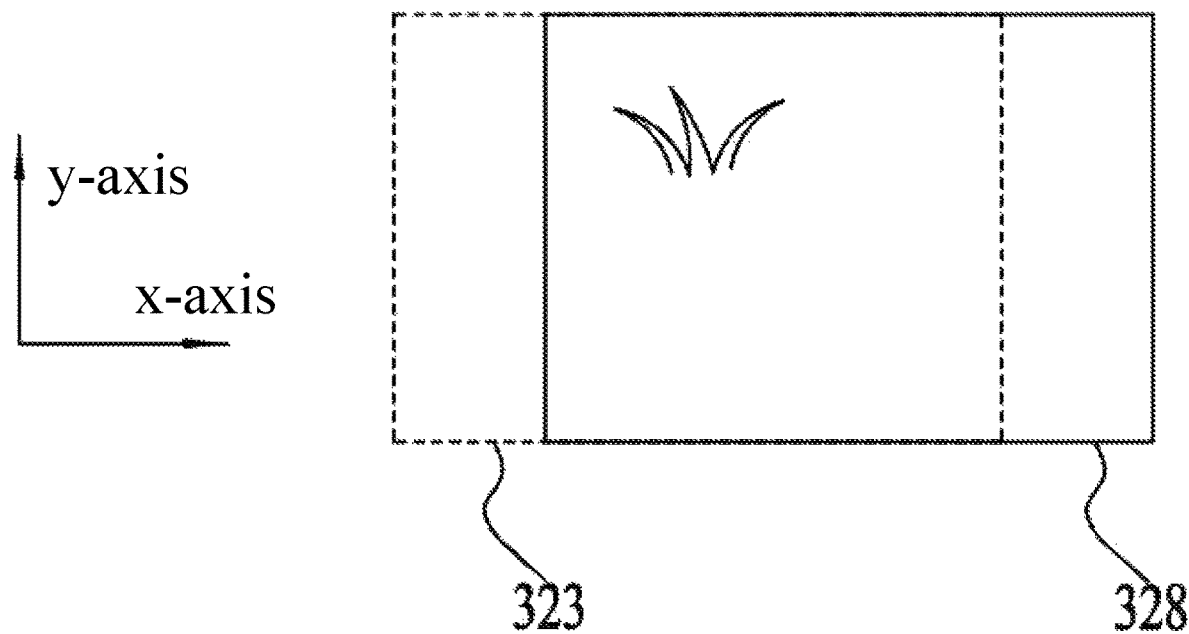
FIG. 28A is a diagram illustrating a principle of the image sensor in FIG. 27 detecting a relative displacement of a self-moving lawn mower on an x-axis.
Figure 28B:
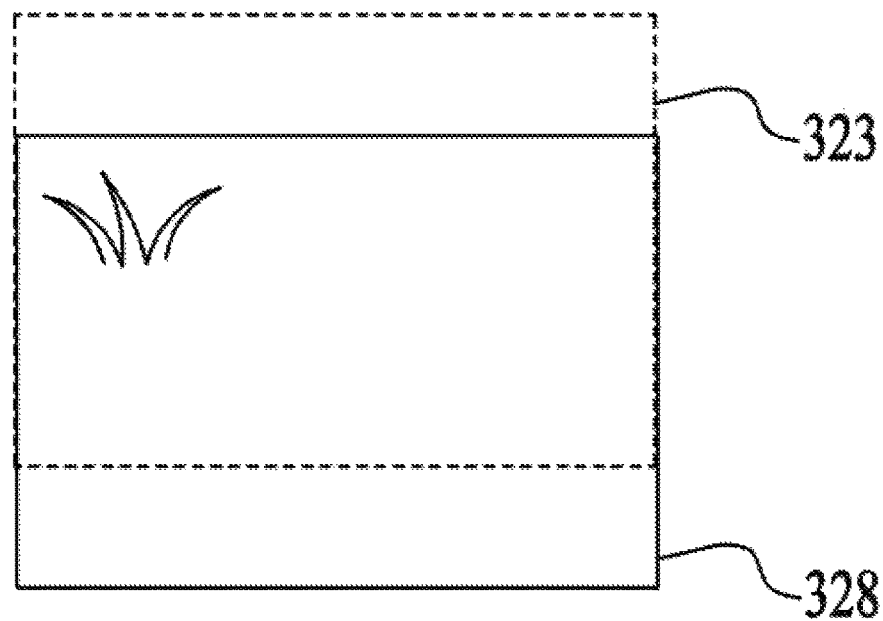
FIG. 28B is a diagram illustrating a principle of the image sensor in FIG. 27 detecting a relative displacement of a self-moving lawn mower on a y-axis.
Figure 28C:
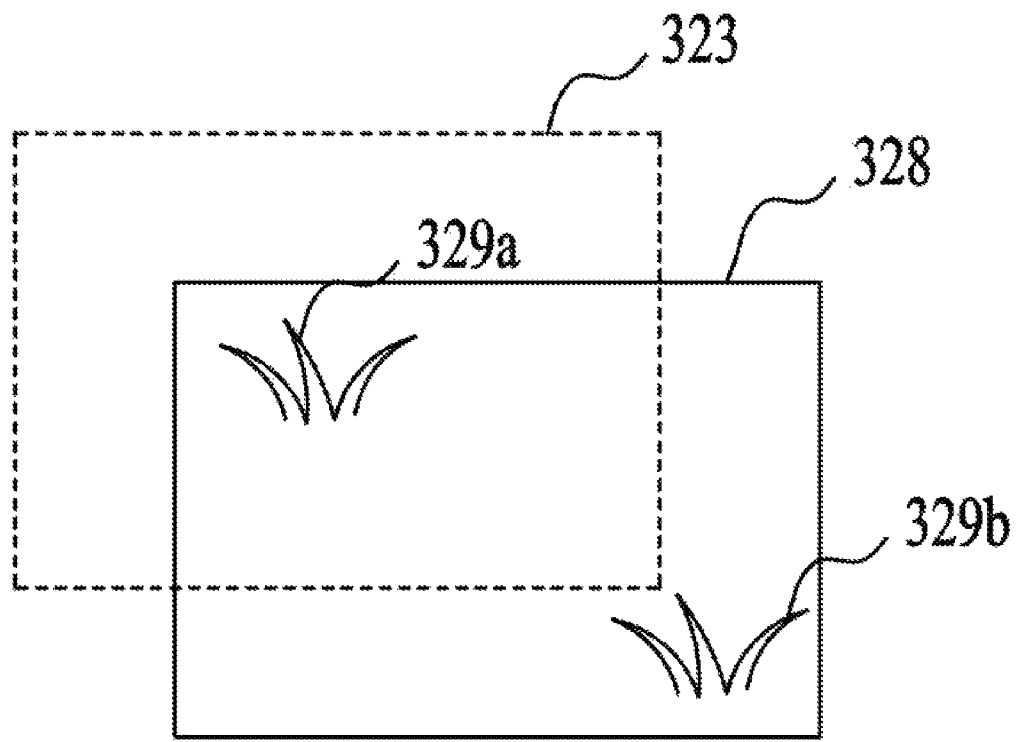
FIG. 28C is a diagram illustrating a principle of the image sensor in FIG. 27 detecting a relative displacement of a self-moving lawn mower.
Figure 28D:
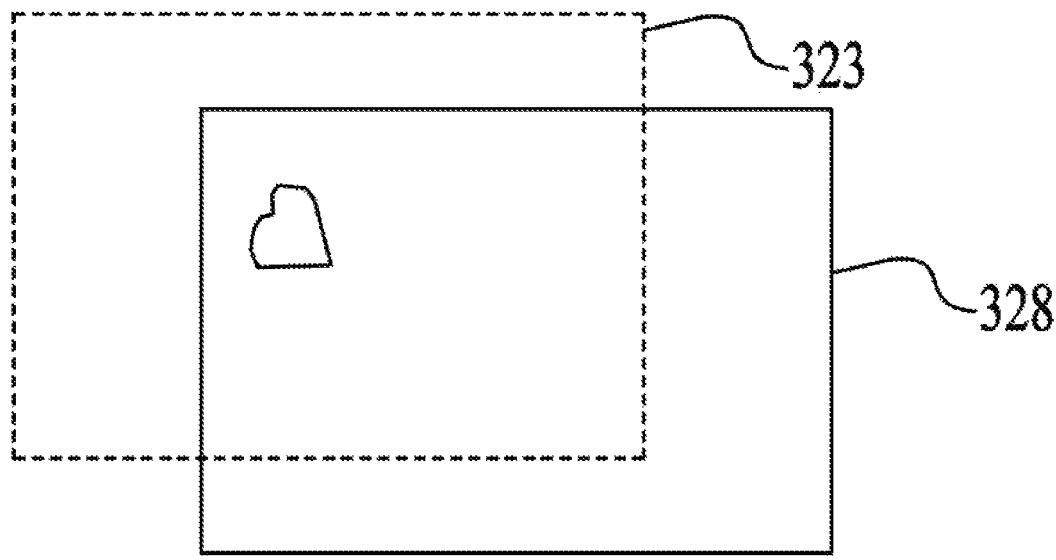
FIG. 28D is a diagram illustrating a principle of the image sensor in FIG. 27 detecting a relative displacement of a self-moving lawn mower.

For example, referring to FIG. 28A, assuming that the self-moving lawn mower has a relative position only on an x-axis, a relative displacement of a first grass 329a in the first positional image information 323 and the second positional image information 328 on the x axis is detected so that a displacement of the self-moving lawn mower on the x-axis can be acquired. Referring to FIG. 28B, assuming that the self-moving lawn mower has a relative position only on the y-axis, a relative displacement of the first grass 329a in the first positional image information 323 and the second positional image information 328 on the y-axis is detected so that a displacement of the self-moving lawn mower on the y-axis can be acquired. Referring to FIG. 28C, assuming that the self-moving lawn mower has relative positions on the x-axis and the y-axis, a vegetation region A is the first positional image information 323, and a vegetation region A' is the second positional image information 328. Through a relative positional relationship between the grass 329a in the first positional image information 323 and the grass 329a in the second positional image information 328, the relative positions of the self-moving lawn mower on the x-axis and the y-axis are determined, and then the position information of the self-moving lawn mower is acquired. The control unit 200a or the information collection module 400a may establish a coordinate system to calculate the position of the self-moving lawn mower, where a plane where the x-axis and the y-axis are located is parallel to a horizontal plane. Referring to FIG. 28D, the first positional image information and the second positional image information may also be image information of other objects such as obstacles.

The image sensor is configured to detect the relative displacement of the self-moving lawn mower. The image sensor continuously or intermittently acquires the moving trajectory of one or more common feature areas in the first positional image information and the second positional image information 328 of the vegetation behind the moving wheels through an imaging device of the image sensor so as to acquire the position information of the self-moving lawn mower or the relative displacement of the self-moving lawn mower on the x-axis and/or the y-axis. For example, the imaging device of the image sensor projects light onto the vegetation near a rear side of the moving wheels. With the moving time and moving displacement of the self-moving lawn mower, within a first time period t0, the moving trajectory of the first grass 329a in the vegetation region A and the vegetation region A' on a film of the image sensor is acquired, that is, the relative displacement of the first grass 329a is obtained so as to acquire the relative displacement of the self-moving lawn mower within the first time period, where the vegetation region A and the vegetation region A' have an overlapping region and the first grass 329a is located at different positions in the overlapping region of the vegetation region A and the vegetation region A'. Within the following second time period t1, the moving trajectory of a second grass 329b in a vegetation region B and a vegetation region B' on the film of the image sensor is acquired, that is, the relative displacement of the second grass 329b is obtained so as to acquire the relative displacement of the self-moving lawn mower within the second time period, where the vegetation region B and the vegetation region B' have an overlapping region and the second grass 329b is located at different positions in the overlapping region of the vegetation region B and the vegetation region B'. Exemplarily, when the self-moving lawn mower moves on the ground with time passing, if the self-moving lawn mower and the image sensor (including the film) installed on the self-moving lawn mower are assumed to be stationary, the image sensor acquires the relative displacement state of the first grass 329a or the second grass 329b in the first positional image information and the second positional image information. In this manner, the displacement information of the first grass 329a and the second grass 329b in any time segment is accumulated and superimposed so that the displacement information of the self-moving lawn mower on the ground is obtained.

An acquisition interval of the first positional image information 323 and the second positional image information 328 may be set according to a speed of the self-moving lawn mower so that one common feature area of the first positional image information 323 and the second positional image information 328 can be effectively acquired, and thus the moving displacement information of the self-moving lawn mower is determined through the common feature area.

Optionally, the second positioning unit 320a may further include the image sensor and a calibration device 327. The calibration device 327 is configured to detect posture information and/or position information of the self-moving lawn mower to compensate for an offset error of a calculation according to the positional image information of the image sensor. The calibration device 327 may include an inertial sensor 325. The image sensor on the self-moving lawn mower acquires the moving trajectory of the self-moving lawn mower, and the inertial sensor 325 acquires angular offset information on the moving trajectory of the self-moving lawn mower so as to correct the position information obtained by the image sensor and obtain more accurate position information of the self-moving lawn mower.

The inertial sensor detects a posture of the self-moving lawn mower, and the control unit calculates a calibration coefficient according to the posture of the self-moving lawn mower and calibrates, according to the calibration coefficient, the displacement of the self-moving lawn mower obtained by the positional image information.

The control unit is configured to obtain, through an analysis, the relative displacement on the x-axis and/or the y-axis or the position information of the self-moving lawn mower according to the temporal moving trajectory of at least one common feature area of the first positional image information and the second positional image information of the image sensor. The inertial sensor can detect an angle of the main body relative to the plane where the x-axis and the y-axis are located.

The control unit is configured to obtain, through the analysis, the relative displacement on the x-axis and/or the y-axis or the position information of the self-moving lawn mower according to the temporal moving trajectory of the at least one common feature area of the first positional image information and the second positional image information of the image sensor. A height sensor can measure a distance between the self-moving lawn mower relative to an object corresponding to the common feature area on a z-axis. The control unit is configured to obtain, through the analysis, the relative displacement on the x-axis and/or the y-axis or the position information of the self-moving lawn mower according to the distance between the self-moving lawn mower and the object corresponding to the common feature area on the z-axis, the angle of the main body relative to the plane where the x-axis and the y-axis are located, and the temporal moving trajectory of the at least one common feature area of the first positional image information and the second positional image information of the image sensor.

The inertial sensor 325 may be implemented as an IMU. The IMU includes an accelerometer and a gyroscope and is configured to detect the angular offset information of the self-moving lawn mower in a moving process so as to determine the posture of the self-moving lawn mower. The control unit calculates the calibration coefficient according to the posture of the self-moving lawn mower and calibrates, according to the calibration coefficient, the displacement of the self-moving lawn mower obtained by the positional image information. The inertial sensor is applied to the acquisition of the posture of the self-moving lawn mower while the image sensor acquires the first positional image information and the second positional image information for the analysis and calibration of the first positional image information and the second positional image information.

The inertial sensor 325 transmits the detected angular offset information of the self-moving lawn mower to the information collection module 400a, and the information collection module 400a analyzes final displacement information of the self-moving lawn mower according to the detected primary position information, displacement information, and angular offset information of the self-moving lawn mower so as to acquire real-time accurate position data of the self-moving lawn mower.

To avoid an error of detection of the positioning assembly 300a or the image sensor due to the undulating terrain of the lawn, the calibration device 327 may further include a height sensor 326 configured to detect level height information of the lawn. The height sensor 326 may also be a distance sensor configured to measure a distance between the self-moving lawn mower and an object to be measured in a height direction. For example, the height sensor 326 may be a distance measuring sensor such as a time-of-flight (TOF) sensor. The TOF sensor emits light and calculates a height of the lawn relative to the image sensor by calibrating a difference between when the light is emitted and when the light is reflected by an object such as the lawn or the ground. The height sensor 326 may detect the distance between the self-moving lawn mower and the object corresponding to the common feature area on the z-axis. For example, if the common feature area is vegetation, the height sensor 326 can measure the distance between the vegetation and the self-moving lawn mower. The control unit calculates the calibration coefficient according to a height parameter of the self-moving lawn mower and calibrates, according to the calibration coefficient, the displacement of the self-moving lawn mower obtained by the positional image information, thereby improving the accuracy of the displacement of the self-moving lawn mower detected by the image sensor.

The height sensor 326 transmits the detected level height data of the lawn relative to the image sensor to the information collection module 400a, and the information collection module 400a generates a calibration coefficient for the position information detected by the positioning assembly 300a according to acquired real-time height information of the self-moving lawn mower. The position information detected by the image sensor 321 is adjusted by using the calibration coefficient so that the following case is avoided: a change in height of the lawn when the self-moving lawn mower moves causes an offset of the first positional image information 323 and the second positional image information 328 acquired by the image sensor 321, and the acquired accurate position information has a relatively large error. The height sensor 326 may also be used for calibration of the angle of the self-moving lawn mower detected by the inertial sensor 325 with an excessively large offset due to the change in height.

In addition to the GPS positioning assembly or the GNSS positioning assembly mentioned above, the first positioning unit 310a may also be a displacement sensor 312 configured to detect the rotational speed or displacement of the moving wheel 130a. The displacement sensor 312 may be disposed on or near the drive motor 140a connected to the moving wheel 130a. The displacement sensor 312 acquires the rotational speed of the moving wheel 130a by detecting the rotational speed or displacement of the drive motor 140a. Alternatively, the displacement sensor 312 is disposed on or near the moving wheel 130a and configured to detect the rotational speed or displacement of the moving wheel 130a so as to acquire the main position estimation of the self-moving lawn mower.

For example, two moving wheels 130a are provided, which are a first moving wheel 131a and a second moving wheel 132a. Correspondingly, the drive motor 140a includes a first drive motor 141a and a second drive motor 142a. At least two displacement sensors 312 are provided and respectively disposed in the first moving wheel 131a and the second moving wheel 132a or respectively disposed in the first drive motor 141a and the second drive motor 142a, so as to acquire a rotational speed of the first moving wheel 131a and a rotational speed of the second moving wheel 132a. The rotational speeds and numbers of rotations of the first moving wheel 131a and the second moving wheel 132a are analyzed so that the main position estimation of the self-moving lawn mower is acquired. In conjunction with the moving trajectory obtained by the image sensor and the angular offset information of the moving trajectory of the self-moving lawn mower detected by the inertial sensor 325, an accurate relative position of the self-moving lawn mower is acquired. Optionally, a speed difference between the first moving wheel 131a and the second moving wheel 132a is analyzed so that a displacement angle of the self-moving lawn mower can be acquired. In conjunction with the rotational speeds and the numbers of rotations of the moving wheels 130a, the accurate relative position of the self-moving lawn mower is acquired.

The control unit includes at least a main position estimation unit configured to establish a main position estimation function g(x, y) of the self-moving lawn mower to obtain the main position estimation of the self-moving lawn mower. The control unit further includes an auxiliary position estimation unit configured to establish an auxiliary position estimation function h(x, y) according to the positional image information obtained by the image sensor to compensate for the main position estimation obtained by the main position estimation unit and obtain a final position estimation of the self-moving lawn mower, where the control unit is configured to drive at least one moving wheel to move toward a target position according to at least a target position instruction and the obtained final position estimation.

Optionally, the control unit 200a establishes the main position estimation function g(x, y) of the self-moving lawn mower according to the positioning data of the first positioning unit to obtain primary position data or the main position estimation of the self-moving lawn mower. For example, it is acquired that the self-moving lawn mower is in a certain region. The auxiliary position estimation function h(x, y) is established by using position information of a second detection unit. For example, a moving trajectory of the self-moving lawn mower in this region is acquired so as to compensate for the obtained primary position data or main position estimation data and obtain final accurate position data of the self-moving lawn mower. For example, the control unit establishes the main position estimation function g(x, y) of the self-moving lawn mower according to the displacement data detected by the displacement sensor and/or the positioning data of the positioning sensor and obtains the main position estimation of the self-moving lawn mower. The auxiliary position estimation function h(x, y) is established by using the position information obtained by the image sensor, the inertial sensor, and the height sensor. In conjunction with the main position estimation, the final position estimation of the self-moving lawn mower is obtained.

The image sensor 321 includes the film and the imaging device. The imaging device may be configured to be a camera, including a lens 324 and a package 325 for installing the lens. The film may be an imaging substrate or a photosensitive surface 327. The imaging device senses an object to be measured projected by the self-moving lawn mower, and the corresponding first positional image information 323 and second positional image information 328 are generated on the film so that the displacement state of the self-moving lawn mower is analyzed by using the moving trajectory of one or more common feature area of the first positional image information 323 and the second positional image information 328. The image sensor may further include a control chip or a PFE board and may process the generated first positional image information and second positional image information 328 to analyze and calculate the displacement information of the self-moving lawn mower or the object to be measured.

When the self-moving lawn mower moves forward and performs mowing, a casing 111a has a front end corresponding to an unmowed region of the mowing element 110a and a rear end corresponding to a mowed region of the mowing element 110a. The casing 111a or the main body has a first edge at the front end of the casing 111a, a second edge at the rear end of the casing 111a, and a third edge and a fourth edge between the front end and the rear end. The first edge, the second edge, the third edge, and the fourth edge form a boundary of the casing 111a of the self-moving lawn mower.

Optionally, the image sensor acquires the positional image information through the corresponding image sensing region, the image sensing region is disposed at a rear end of the main body, and the image sensor acquires the first positional image information and the second positional image information of the image sensing region in chronological order, where the first positional image information and the second positional image information have at least one common feature area. The control unit is configured to obtain, through the analysis, the relative displacement of the self-moving lawn mower according to at least the temporal moving trajectory of the at least one common feature area of the first positional image information and the second positional image information of the image sensor.

Optionally, referring to FIG. 20, the image sensor 321 is disposed at the rear end 112a of the casing 111a or at a rear end of the self-moving lawn mower and connected to the information collection module 400a. The angle or steering of the image sensor 321 may be adjusted to be relatively downward so that the image sensing region 322 acquired by the self-moving lawn mower is the ground. When the self-moving lawn mower moves and mows the lawn, an image corresponding to the image sensing region 322 is the lawn and the first positional image information 323 and the second positional image information 328 are changing images of the lawn. The image sensor 321 is disposed at the rear end of the casing 111a, which corresponds to the mowed region of the self-moving lawn mower, and the grass is flattened by the self-moving lawn mower passing through the grass so that the lawn with different heights can be effectively prevented from affecting the acquisition of content of the image sensing region 322 by the image sensor 321, thereby improving the accuracy of the displacement of the self-moving lawn mower detected by the image sensor 321.

Figure 22:
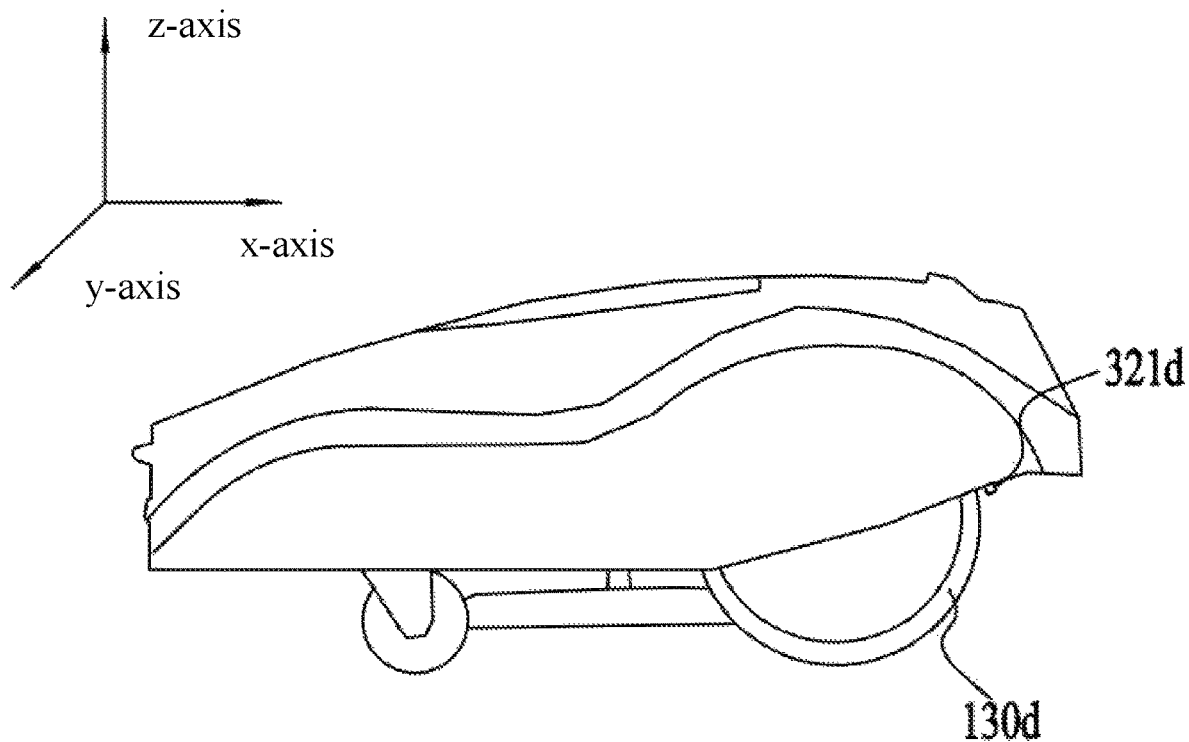
FIG. 22 is a plan view of a self-moving lawn mower according to an example.

Referring to FIG. 22, an image sensor 321d may be disposed near a rear side of moving wheels 130d or a rear side of grass pressing wheels of the self-moving lawn mower and is connected to the information collection module. The image sensing region generated by the image sensor 321d corresponds to a rear of the moving wheels 130d of the self-moving lawn mower, and the lens is disposed downward so that the ground or the vegetation can enter the image sensing region. When the self-moving lawn mower moves and performs mowing, the image sensor 321 acquires an image of the lawn that is pressed by the moving wheels 130d of the self-moving lawn mower so that the image sensing region acquired by the image sensor 321d may be less blocked by grass with different heights or relatively large heights, improving the accuracy of the first positional image information and the second positional image information acquired by the image sensor 321d and improving the accuracy of determination of the displacement of the self-moving lawn mower. Optionally, a distance between the image sensor 321d and the moving wheels 130d is greater than or equal to 1.5 cm and less than or equal to 3.5 cm. Optionally, the distance between the image sensor 321d and the moving wheels 130d is less than 2 cm. In this manner, the vegetation is pressed and lowered by the moving wheels 130d so that the interference of the vegetation on the detection of the image sensor 321d can be reduced. After the image sensor is disposed at this position, the accuracy of positioning the self-moving lawn mower by the image sensor can be effectively improved, and the error can be controlled to be within a proper accuracy range, for example, about 3%.

Figure 23:
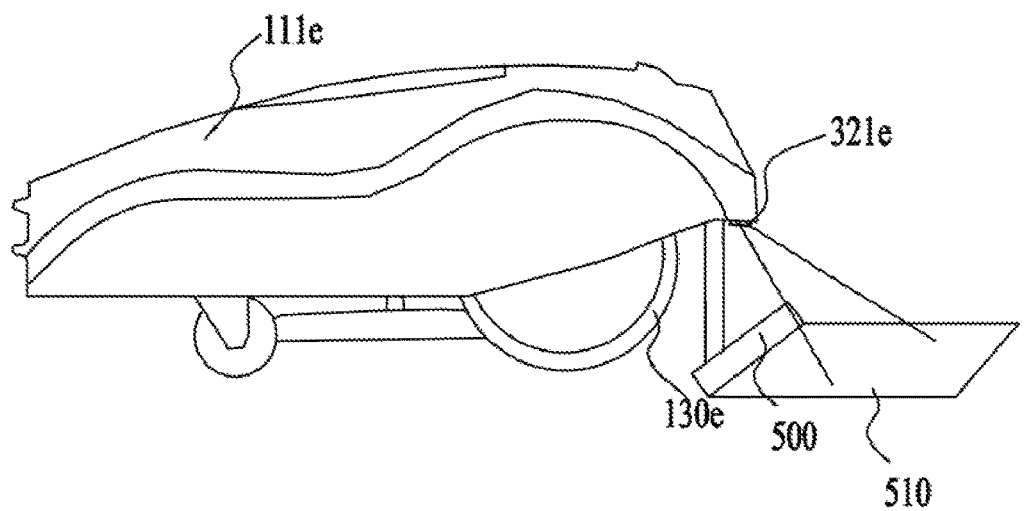
FIG. 23 is a plan view of a self-moving lawn mower according to another example.

In an example, referring to FIG. 23, the self-moving lawn mower is provided with a grass pressing piece 500. Optionally, the grass pressing piece 500 is disposed on moving wheels 130e, for example, a grass pressing surface or a convex surface is formed on the moving wheels 130e.

Alternatively, the grass pressing piece 500 is connected to a casing 111e of the self-moving lawn mower. The grass pressing piece 500 forms the grass pressing surface for pressing the lawn. The grass pressing surface has a preset width. In this manner, when the self-moving lawn mower moves on the vegetation, a compaction surface 510 is formed on the vegetation through the grass pressing surface of the grass pressing piece 500 so that a surface of the lawn is lowered. Moreover, an image sensing region of an image sensor 321e corresponds to the compaction surface 510 generated by the current self-moving lawn mower, and at least part of the compaction surface is located in the image sensing region. The lowered lawn can reduce the interference of the height of the grass on the acquisition of the first positional image information and the second positional image information by the image sensor 321e so that the acquired first positional image information and second positional image information are clear and complete, thereby improving the detection accuracy of the position of the self-moving lawn mower. Exemplarily, the moving wheels may be directly made into the grass pressing wheels, that is, the grass pressing piece is disposed on the moving wheels so that the interference of the height of the grass on the image sensor parsing image information is reduced. The grass pressing piece is connected to the rear end of the casing, and the image sensor is disposed at the rear end of the casing. In this manner, as the self-moving lawn mower moves, the grass pressing piece presses the vegetation, and the image sensor detects the pressed vegetation so that the interference of the vegetation with different heights on the acquisition of the positional image information by the image sensor is reduced, thereby improving the detection accuracy of the image sensor. Optionally, the height sensor is also disposed at the rear end of the casing and near the image sensor.

Figure 24:
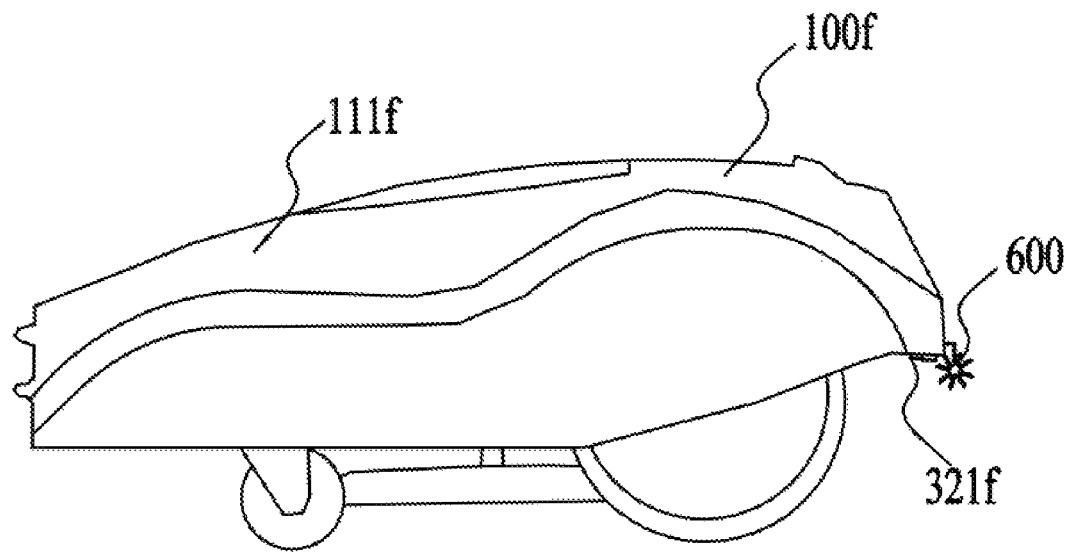
FIG. 24 is a plan view of a self-moving lawn mower according to another example.

In an example, referring to FIG. 24, the self-moving lawn mower forms an airflow on a main body 100f through an airflow generation device 600 and makes the airflow flow through a surface of an image sensor 321f. Since the image sensor 321f determines the displacement state of the self-moving lawn mower by the displacement of the common feature area of the first positional image information and the second positional image information, relatively high requirements are put on the imaging quality of the first positional image information and the second positional image information. During operation, the self-moving lawn mower moves and performs mowing, and grass clippings and dust brought by the mowing are attached to the image sensor 321f. Long-term accumulation of the grass clippings and dust will seriously affect the imaging effect of the image sensor 321f, and the dust or grass clippings caused by the mowing operation of the self-moving lawn mower will block the image sensing region, affecting the imaging result and interfering with the determination of the displacement of the self-moving lawn mower. A distance between the airflow generation device and the image sensor is configured to be greater than or equal to 2 cm and less than or equal to 8 cm, and a flow direction of the airflow generated by the airflow generation device is away from the imaging device. The airflow generation device 600 may be a fan disposed near the image sensor 321f and continuously generate the airflow when the self-moving lawn mower is in operation, so as to reduce the interference of the dust or grass clippings on the detection of the image sensor 321f.

The main body 100f includes an air inlet, an air outlet, and an airflow channel guiding the airflow from the air inlet to the air outlet. The image sensor 321 is disposed near the air outlet of the airflow channel, and the surface of the image sensor 321 is impacted by the airflow flowing out of the air outlet. The airflow in the airflow channel may be generated through the moving state of the self-moving lawn mower or may be generated through the operation of the airflow generation device 600, such as the fan, disposed in the self-moving lawn mower or on a casing 111f.

Figure 25:
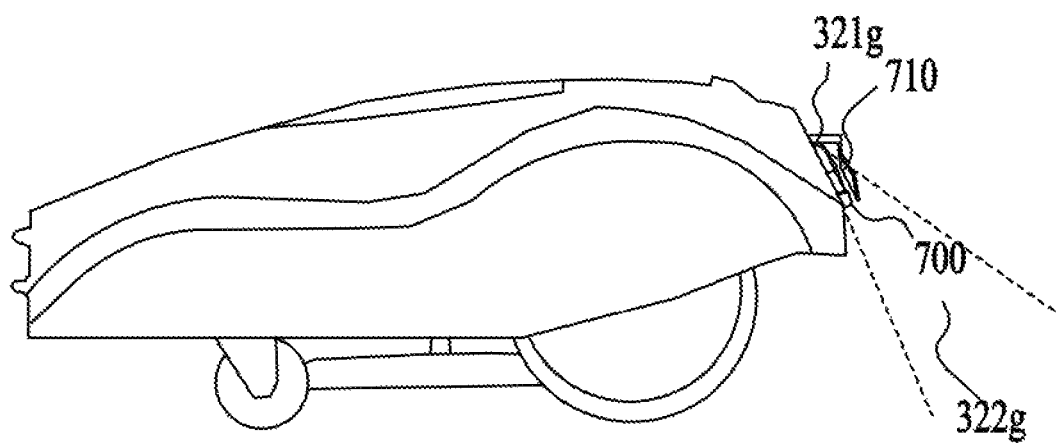
FIG. 25 is a plan view of a self-moving lawn mower with a light source filtering device.

Referring to FIG. 25, in an example, to optimize an image sensor 321g, a light source supplementing device 700 and a light source filtering device 710 may be provided. The light source supplementing device 700 may emit light with a single spectrum, for example, a light source such as a laser, and project the light to an image sensing region 322g. The light source filtering device 710 is disposed in the front of the image sensor 321g and configured to filter other light sources and only allow the light with a single spectrum to pass through, for example, the light source such as the laser. The first positional image information and the second positional image information of detection light with a single spectrum emitted by the light source supplementing device 700 are acquired so that the displacement information of the self-moving lawn mower is acquired, thereby improving the detection accuracy of the displacement and position of the self-moving lawn mower. Optionally, a light source with a single spectrum of light is transmitted through the light source supplementing device 700 so as to emit light with a single spectrum to the vegetation through which the self-moving lawn mower passes; the light source filtering device 710 is configured to allow a light source with the same spectrum as a detection light source transmitted by the light source supplementing device 700 to pass through so that only the light with the same spectrum can be acquired, detected, and analyzed by the image sensor 321g, thereby effectively reducing the influence of outdoor ambient light on a measurement accuracy of an optical flow sensor.

Optionally, the self-moving lawn mower further includes an ultrasonic sensor and a collision sensor configured to detect an obstacle. Both the ultrasonic sensor and the collision sensor are communicatively connected to the information collection module 400. The ultrasonic sensor transmits an ultrasonic wave, detects whether an obstacle exists on a preset route of the self-moving lawn mower, and records position information of the obstacle. The ultrasonic wave bounced by the obstacle is sensed by the ultrasonic sensor, and the position of the obstacle is analyzed and acquired by a time interval. When the self-moving lawn mower hits the obstacle, the collision sensor feels shaking of the casing 111a or a pressure change of the casing 111a and analyzes whether the self-moving lawn mower hits the obstacle. Therefore, the collision sensor may be configured to be a Hall sensor configured to detect a displacement state or a pressure sensor configured to detect a pressure change.

Optionally, the final accurate position information of the self-moving lawn mower is acquired by using only one or more image sensors, that is, the combination of the first positioning unit and the second positioning unit is no longer used for obtaining the final accurate position information, and only a combination of one or more image sensors is used for directly acquiring the final accurate position information. One or more image sensors may be used for acquiring a 3G three-dimensional scene at the position of the self-moving lawn mower, thereby acquiring positioning information of the self-moving lawn mower. For example, one or more image sensors may collect the 3G three-dimensional scene at the position of the self-moving lawn mower and interact with map interfaces such as AutoNavi Map or Google Map. In this manner, actual positioning information of the self-moving lawn mower is obtained, and then the control unit of the self-moving lawn mower drives at least one moving wheel to move toward a target position according to at least a target position instruction and the obtained final position estimation. The map interfaces such as AutoNavi Map or Google Map may be directly disposed on a display screen of the self-moving lawn mower or on a display screen of a mobile device such as a mobile phone. Exemplarily, one or more image sensors may be movably steered to obtain a 3G three-dimensional scene or a 360° three-dimensional scene of a predetermined region of the self-moving lawn mower, which is not limited here.

Figure 26:
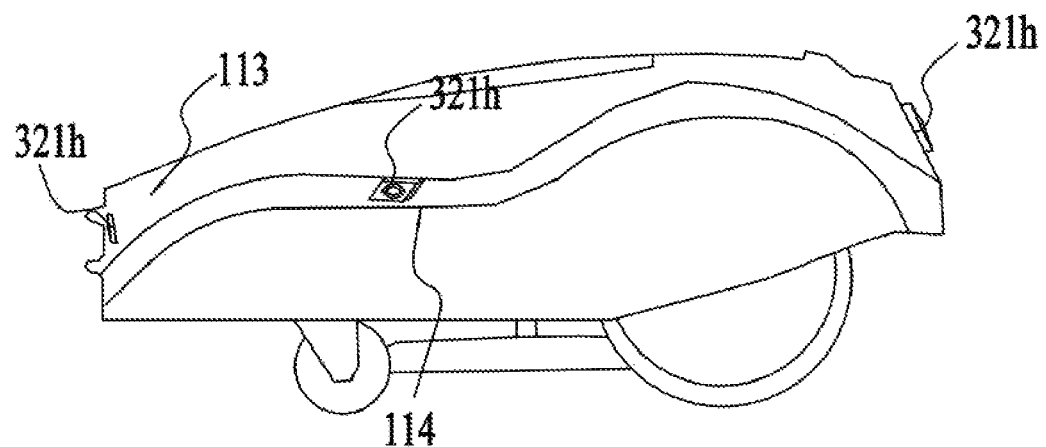
FIG. 26 is a plan view of a self-moving lawn mower according to another example.
Figure 27:
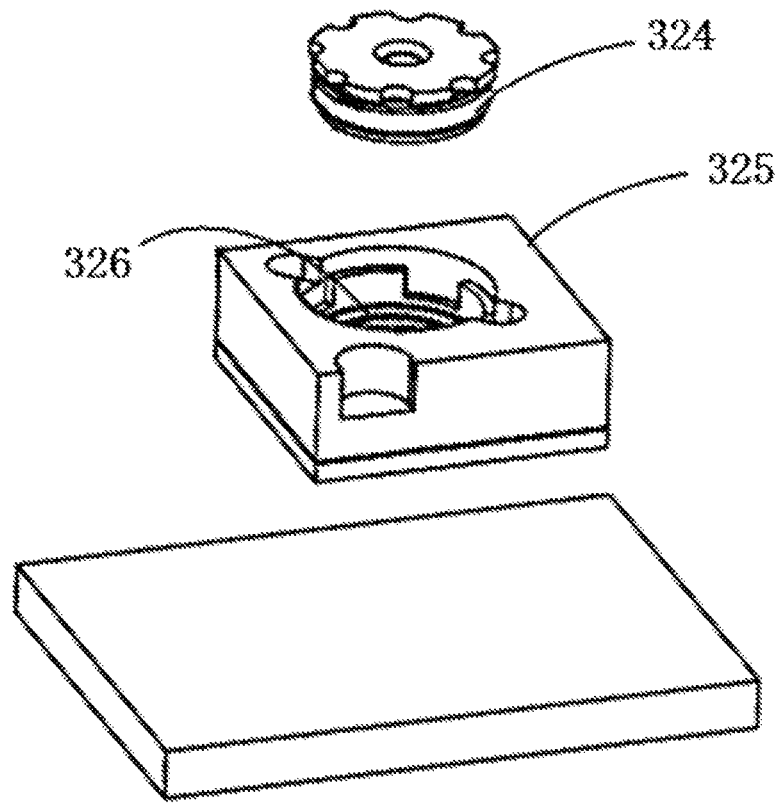
FIG. 27 is a structural view of an image sensor.

Referring to FIG. 26, the self-moving lawn mower further includes multiple image sensors 321h disposed at at least two of a front end 113, a rear end, or a side end 114 of the main body.

The image sensors 321h are disposed near a peripheral edge of the main body and configured to sense first positional image information and second positional image information formed by an object to be measured in a preset reference plane in chronological order, where the first positional image information and the second positional image information have at least one common feature area, the at least one common feature area includes one or more feature points, and the peripheral edge of the main body includes a first edge, a second edge, a third edge, and/or a fourth edge. One or more image sensors may be disposed on a top side of the main body or a main casing, and position information of the self-moving lawn mower or the object to be measured may also be obtained. The object to be measured is the vegetation or the obstacle to be measured on the ground. Optionally, the first edge, the second edge, the third edge, and the fourth edge not only refer to the boundary of the self-moving lawn mower but may also include a certain position near the boundary of the lawn mower and at a certain distance from the boundary of the intelligent lawn mower. Optionally, the image sensor disposed on the top side of the main body or the main casing can acquire the position information or positioning information of the self-moving lawn mower or the object to be measured by acquiring the 3G three-dimensional scene at the position of the self-moving lawn mower or the 3G three-dimensional scene of the object to be measured.

Information about the obstacle may be acquired through the image sensors 321h. One or more image sensors may be disposed on the peripheral edge of the main body of the self-moving lawn mower, such as the first edge, the second edge, the third edge, and/or the fourth edge. One or more image sensors acquire the information of the image sensing region and analyze whether the obstacle exists in the image sensing region or a distance between the obstacle and the self-moving lawn mower, that is, position information of the obstacle. Optionally, at least two image sensors may be provided, or an image sensing device is provided with a binocular camera, and the position information of the obstacle is acquired through the fusion of different positional image information collected by the binocular camera. Based on the preceding examples, the control unit analyzes the route of the self-moving lawn mower according to the analyzed position information of the self-moving lawn mower, a control instruction, and the tracked displacement state of the self-moving lawn mower, drives at least one moving wheel to move toward the target position, and drives a mowing blade to rotate.

Figure 29:
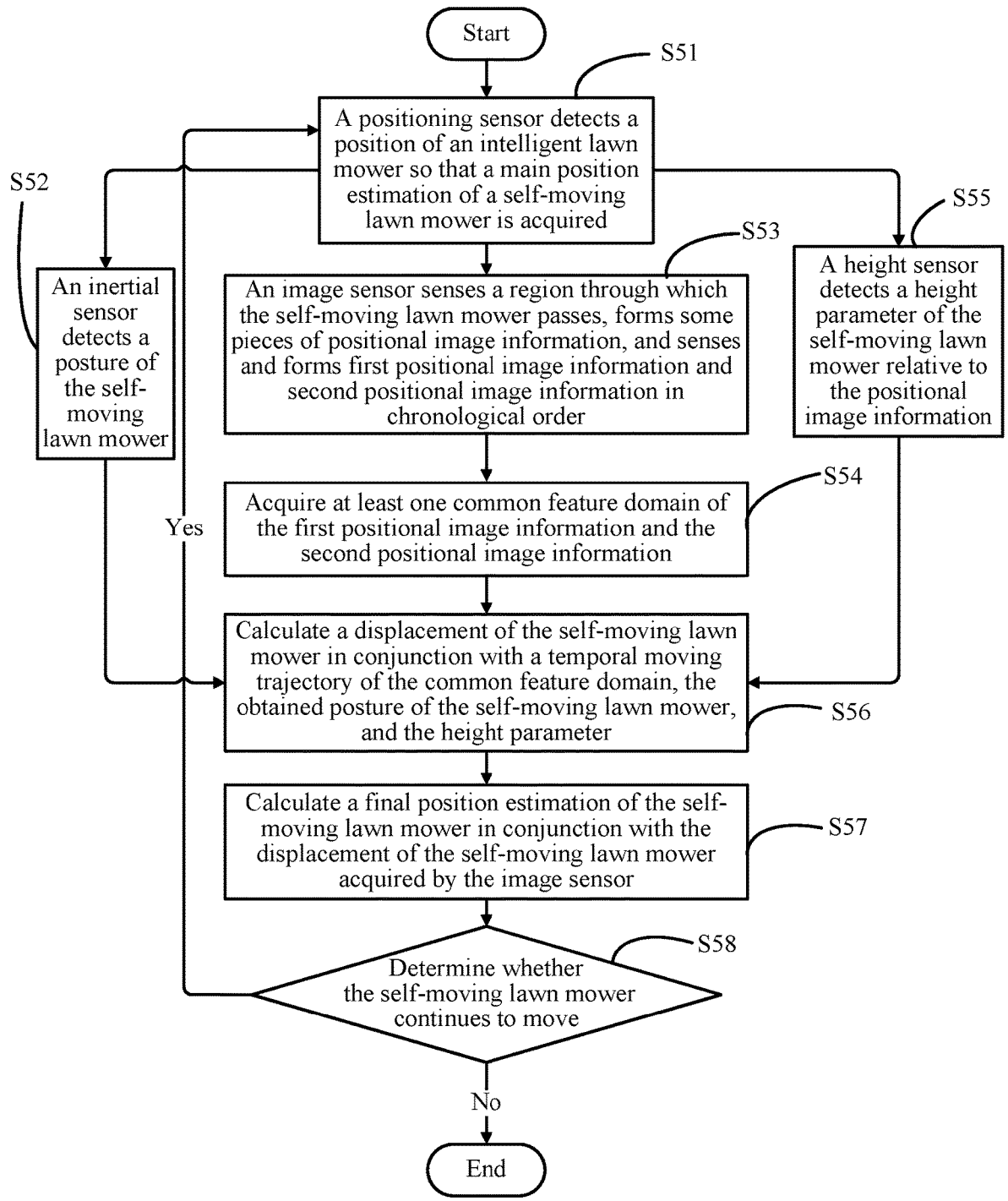
FIG. 29 is a flowchart for detection of a position of a self-moving lawn mower.

To sum up, a positioning process for detecting a position of a self-moving lawn mower is provided. Referring to FIG. 29, in step S51, a positioning sensor detects a position of the self-moving lawn mower so that a main position estimation of the self-moving lawn mower is acquired; in step S52, an inertial sensor detects a posture of the self-moving lawn mower; in step S53, an image sensor senses a region through which the self-moving lawn mower passes, forms some pieces of positional image information, and senses and forms first positional image information and second positional image information in chronological order; in step S54, at least one common feature area of the first positional image information and the second positional image information is acquired; in step S55, a height sensor detects a height parameter of the self-moving lawn mower relative to the positional image information; in step S56, a displacement of the self-moving lawn mower is calculated in conjunction with a temporal moving trajectory of the common feature area, the obtained posture of the self-moving lawn mower, and the height parameter; in step S57, a final position estimation of the self-moving lawn mower is calculated in conjunction with the displacement of the self-moving lawn mower acquired by the image sensor; in step S58, whether the self-moving lawn mower continues to move is detected. If so, step S51 is repeated. If not, the process ends.

What is claimed is:

1. A self-moving lawn mower, comprising:
   a main body comprising a casing;
   a mowing element connected to the main body and configured to cut vegetation;
   an output motor configured to drive the mowing element;
   moving wheels connected to the main body;
   a drive motor configured to drive the moving wheels to rotate; and
   a control unit connected to the output motor and the drive motor and configured to control the output motor and the drive motor,
   wherein the control unit is configured to:
      identify all unmowed regions within an operation boundary;
      generate an operation route for mowing in at least one unmowed region among the all unmowed regions; and
      control the drive motor so that the self-moving lawn mower mows in the at least one unmowed region among the all unmowed regions according to the operation route, and
      wherein the control unit is configured to identify the all unmowed regions within the operation boundary according to at least one of a moving trajectory of the self-moving lawn mower or a positional image information related to the moving trajectory.

2. The self-moving lawn mower of claim 1, wherein a shortest route along which mowing is sequentially performed in the at least one unmowed region among the all unmowed regions is defined as a shortest operation route and a ratio of a length of the operation route to a length of the shortest operation route is greater than or equal to 1 and less than or equal to 1.2.

3. The self-moving lawn mower of claim 1, wherein the control unit comprises a filling planning module configured to calculate a shortest operation route for the self-moving lawn mower to supplementary operate the all unmowed regions.

4. The self-moving lawn mower of claim 3, wherein the control unit is configured to control the self-moving lawn mower to sequentially perform the supplementary operation on the all unmowed regions along the shortest operation route.

5. The self-moving lawn mower of claim 4, wherein after the self-moving lawn mower performs the supplementary operation on each of the all unmowed regions and a coverage rate of the supplementary operation the self-moving lawn mower is controlled to perform on the each of the all unmowed regions is greater than 80%.

6. The self-moving lawn mower of claim 1, wherein the self-moving lawn mower further comprises a positioning assembly and the positioning assembly comprises one of or a combination of a global positioning system (GPS) positioning unit, an inertial measurement unit (IMU), a displacement sensor, and an image sensor.

7. The self-moving lawn mower of claim 6, wherein the positioning assembly acquires an operation trajectory of the self-moving lawn mower, a non-operated region of the self-moving lawn mower within the operation boundary is determined according to the operation trajectory of the self-moving lawn mower and information about the operation boundary and, in a case where an area of the non-operated region is greater than a preset value, the non-operated region is determined to be an unmowed region.

8. The self-moving lawn mower of claim 1, wherein the self-moving lawn mower further comprises an image sensor and the image sensor is configured to acquire a two-dimensional image or a three-dimensional image within the operation boundary to acquire information about the all unmowed regions operated by the self-moving lawn mower.

9. The self-moving lawn mower of claim 1, wherein the self-moving lawn mower further comprises a positioning assembly comprising at least one of an image sensor configured to sense the moving trajectory or the positional image information of the self-moving lawn mower.

10. The self-moving lawn mower of claim 9, wherein the image sensor is configured to sense and form a first positional image information and a second positional image information in chronological order, the first positional image information and the second positional image information have at least one common feature area, and the control unit is configured to obtain a relative displacement of the self-moving lawn mower by analyzing at least a temporal moving trajectory of the at least one common feature area of the first positional image information and the second positional image information.

11. The self-moving lawn mower of claim 9, wherein the image sensor is disposed behind the moving wheels.

12. The self-moving lawn mower of claim 9, wherein a distance between the image sensor and one of the moving wheels is greater than or equal to 1.5 cm and less than or equal to 3.5 cm.

13. The self-moving lawn mower of claim 9, wherein the image sensor comprises a lens and a package for installing the lens and the lens is arranged downward so that a ground or the vegetation is capable of entering an image sensing region.

14. The self-moving lawn mower of claim 1, wherein the self-moving lawn mower further comprises an interactive interface communicatively connected to the control unit and operated so as to add or remove an unmowed region.

15. A supplementary operation method for unmowed region of a self-moving mowing system, comprising:
selecting an operation region of the self-moving mowing system;
starting the self-moving mowing system, positioning a self-moving lawn mower of the self-moving mowing system to acquire an operation moving trajectory, and determining that a coverage region of moving operation of the self-moving lawn mower is an operated region;
acquiring a non-operated region in the operation region by analyzing the operation region and the operated region and determining that a non-operated region with an area greater than a preset value is the unmowed region;
planning an operation route for supplementary operation on unmowed regions according to information about the unmowed regions; and
controlling the self-moving lawn mower to perform the supplementary operation on at least one unmowed region among all the unmowed regions according to the operation route,
wherein positioning the self-moving lawn mower of the self-moving mowing system comprises:
detecting, by an inertial sensor, a posture of the self-moving lawn mower;
sensing, by an image sensor, a region through which the self-moving lawn mower passes, forming positional image information, and sensing and forming a first positional image information and a second positional image information in chronological order;
acquiring at least one common feature area of the first positional image information and the second positional image information;
detecting, by a height sensor, a height parameter of the self-moving lawn mower relative to the positional image information, and
calculating a displacement of the self-moving lawn mower according to a temporal moving trajectory of the at least one common feature area, the posture of the self-moving lawn mower, and the height parameter.

* * * * *